United States Patent
Alzahrani et al.

(10) Patent No.: US 11,417,106 B1
(45) Date of Patent: Aug. 16, 2022

(54) CROWD EVACUATION SYSTEM BASED ON REAL TIME PERCEPTION, SIMULATION, AND WARNING

(71) Applicant: King Abdulaziz University, Jeddah (SA)

(72) Inventors: Bander A. Alzahrani, Jeddah (SA); Ahmed Barnawi, Jeddah (SA); Min Chen, Wuhan (CN)

(73) Assignee: King Abdulaziz University, Jeddah (SA)

(*) Notice: Subject to any disclaimer, the term of this patent is extended or adjusted under 35 U.S.C. 154(b) by 0 days.

(21) Appl. No.: 17/592,561

(22) Filed: Feb. 4, 2022

(51) Int. Cl.
  *G06V 20/52* (2022.01)
  *G06T 17/00* (2006.01)
  (Continued)

(52) U.S. Cl.
  CPC ........... *G06V 20/53* (2022.01); *G06Q 90/205* (2013.01); *G06T 7/20* (2013.01); *G06T 7/70* (2017.01);
  (Continued)

(58) Field of Classification Search
  CPC ...... G06V 20/53; G06V 2201/08; G06T 7/70; G06T 7/20; G06T 13/40; G06T 17/00; G06T 2207/10028; G06Q 90/205; G08B 21/02; G08B 21/182; G08G 5/0043; G08G 9/02
  See application file for complete search history.

(56) References Cited

U.S. PATENT DOCUMENTS

| 10,769,855 B2* | 9/2020 | Alabastro ............. G06T 19/006 |
| 11,312,392 B2* | 4/2022 | Katardjiev ....... G08G 1/096725 |

(Continued)

FOREIGN PATENT DOCUMENTS

CN  104239636 B  5/2017

OTHER PUBLICATIONS

Zhou, Min, et al. "Guided crowd evacuation: approaches and challenges." IEEE/CAA Journal of Automatica Sinica 6.5 (2019): 1081-1094.*

(Continued)

*Primary Examiner* — Shefali D Goradia
(74) *Attorney, Agent, or Firm* — Oblon, McClelland, Maier & Neustadt, L.L.P.

(57) ABSTRACT

A method for real-time crowd management includes receiving LiDAR point cloud data from area of interest, forming a 3D static surface model of area of interest from LiDAR point cloud data, obtaining real-time CCTV camera images of area of interest, adding real-time CCTV camera images to 3D static surface model to generate real-time dynamic 3D model, identifying dynamic objects in the 3D model, generating a density map of an area of interest, adding density map to the 3D model, identifying which dynamic objects are people, replacing each person with animated character, displaying real-time dynamic 3D model, monitoring the 3D model in the area of interest for dangerous situations, simulating evacuation of area of interest by manipulating animated characters onto pathways leading away from area of interest, forming an evacuation strategy for crowd, and transmitting a notice of the dangerous situation and the evacuation strategy to an emergency authority.

15 Claims, 15 Drawing Sheets

(51) Int. Cl.
*G06T 13/40* (2011.01)
*G06T 7/70* (2017.01)
*G06T 7/20* (2017.01)
*G08B 21/18* (2006.01)
*G08G 9/02* (2006.01)
*G08G 5/00* (2006.01)
*G06Q 90/00* (2006.01)
*G08B 21/02* (2006.01)

(52) U.S. Cl.
CPC .............. *G06T 13/40* (2013.01); *G06T 17/00* (2013.01); *G08B 21/02* (2013.01); *G08B 21/182* (2013.01); *G08G 5/0043* (2013.01); *G08G 9/02* (2013.01); *G06T 2207/10028* (2013.01); *G06V 2201/08* (2022.01)

(56) References Cited

U.S. PATENT DOCUMENTS

2015/0297949 A1* 10/2015 Aman ................... G06T 7/246
                                                    348/157
2019/0051046 A1    2/2019  Jin et al.
2020/0193671 A1    6/2020  Tamir et al.
2021/0116943 A1    4/2021  Wang et al.
2021/0215319 A1*   7/2021  Raring ................ H04B 10/503
2021/0376928 A1*  12/2021  McLaurin ............. H01S 5/005

OTHER PUBLICATIONS

M. Kölle, et al., "Which 3D Data Representation Does The Crowd Like Best? Crowd-Based Active Learning For Coupled Semantic Segmentation of Point Clouds and Textured Meshes", ISPRS Annals of the Photogrammetry, Remote Sensing and Spatial Information Sciences, XXIV ISPRS Congress, vol. V-2-2021, 2021, pp. 93-100.

Qiao Yu, et al., "Intelligent Visual-IoT-Enabled Real-Time 3D Visualization for Autonomous Crowd Management", IEEE Wireless Communications, vol. 8, Issue 4, Aug. 2021, pp. 34-41.

Zhaoqing Wang, et al., "The Comparison of Crowd Counting Algorithms based on Computer Vision", ISPECE, IOP Publishing, Journal of Physics: Conference Series, vol. 1187, Issue 4, 2019, 7 pages.

* cited by examiner

202

204

402

404

CROWD EVACUATION SYSTEM BASED ON REAL TIME PERCEPTION, SIMULATION, AND WARNING

STATEMENT REGARDING PRIOR DISCLOSURE BY THE INVENTORS

Aspects of this technology are described in an article "Intelligent Visual-IoT-Enabled Real-Time 3D Visualization for Autonomous Crowd Management", published in IEEE Wireless Communications. 28. 34-41, 2021, DOI: 10.1109/MWC.021.2000497, on Aug. 11, 2021, which is incorporated herein by reference in its entirety.

STATEMENT OF ACKNOWLEDGEMENT

The inventors extend their appreciation to the Deputyship for Research and Innovation, Ministry of Education in Saudi Arabia for funding this research work through the project number 2021-063 and King Abdulaziz University, DSR, Jeddah, Saudi Arabia.

TECHNICAL FIELD

The present disclosure is directed to a crowd evacuation system and methods. In particular, the present disclosure relates to crowd evacuation based on real time perception, simulation, and warning.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Real-time crowd management systems play a vital role in urban planning, disaster warning, and emergency evacuation. Intelligent video surveillance application is one potential application of these real-time crowd management systems. In the field of video surveillance, closed-circuit television (CCTV) cameras are deployed in fixed locations. These CCTV cameras stream video data which is then processed by artificial intelligence (AI) algorithms to provide various services such as recognizing a license plate number of an illegally parked vehicle, facial detection in public places, and real-time target tracking. However, the video surveillance application is limited within the 2D coordinate system of each single CCTV camera and suffers from a lack complete cognition of the real 3D world as the AI algorithms analyze the video stream data from a single camera. This results in a lack of connection and fusion of data from different CCTV cameras, limiting the system intelligence and effectiveness of the surveillance.

Accordingly, it is one object of the present disclosure to provide real-time 3D visualization methods and systems for crowd management, based on real time perception and simulation, and generating evacuation instructions which are transmitted to emergency authorities monitoring the crowd.

SUMMARY

In an exemplary embodiment, a method for real-time crowd management is disclosed. The method includes receiving LiDAR point cloud data collected by unmanned aerial vehicles (UAVs) flying over an area of interest, forming a 3D static surface model of the area of interest from the LiDAR point cloud data, obtaining real-time CCTV camera images of the area of interest, adding the real-time CCTV camera images to the 3D static surface model to generate a real-time dynamic 3D model, identifying a plurality of dynamic objects in the real-time dynamic 3D model, generating a density map of the area of interest, adding the density map to the real-time dynamic 3D model, identifying which dynamic objects are people, replacing each person with an animated character, displaying the real-time dynamic 3D model, monitoring the real-time dynamic 3D model in the area of interest for dangerous situations, simulating an evacuation of the area of interest by manipulating the animated characters onto pathways leading away from the area of interest, forming an evacuation strategy for the crowd, and transmitting a notice of the dangerous situation and the evacuation strategy to an emergency authority.

In another exemplary embodiment, a system for real-time crowd management in an area of interest is disclosed. The system includes a plurality of unmanned aerial vehicles (UAVs) configured to fly within the area of interest, a plurality of LiDAR sensors, each LiDAR sensor located in one of the plurality of UAVs, wherein each LiDAR sensor is configured to generate point cloud data, a plurality of CCTV surveillance cameras located in the area of interest, wherein each CCTV surveillance camera is configured to take images of the area of interest, and generate CCTV image data, a plurality of humidity sensors located in the area of interest, each humidity sensor configured to detect water content of air in the area of interest and generate humidity sensor data, a plurality of gas sensors located in the area of interest, each gas sensor configured to detect a specific gas in the air of the area of interest and generate gas detection data, a plurality of infrared cameras located in the area of interest, wherein each infrared camera is configured to take thermally image the area of interest, and generate thermal image data, and a computing device having circuitry including a memory storing program instructions and one or more processors configured to perform the program instructions, wherein the computing device is configured to receive the point cloud data, the CCTV image data, the humidity sensor data, the gas detection data, and the thermal image data and generate a real-time dynamic 3D model of the area of interest.

In another exemplary embodiment, a non-transitory computer readable medium having instructions stored therein that, when executed by one or more processors, cause the one or more processors to perform a method for real-time crowd management. The method includes identifying an area of interest, receiving LiDAR point cloud data collected by unmanned aerial vehicles (UAVs) flying over an area of interest, forming a 3D static surface model of the area of interest from the LiDAR point cloud data, obtaining real-time CCTV camera images of the area of interest, adding the real-time CCTV camera images to the 3D static surface model to generate a real-time dynamic 3D model, identifying a plurality of dynamic objects in the real-time dynamic 3D model, generating a density map of the area of interest, adding the density map to the real-time dynamic 3D model, identifying which dynamic objects are people, replacing each person with an animated character, displaying the real-time dynamic 3D model, monitoring the real-time dynamic 3D model in the area of interest for dangerous situations, simulating an evacuation of the area of interest by manipulating the animated characters onto pathways leading away from the area of interest, forming an evacuation strategy for the crowd, and transmitting a notice of the dangerous situation and the evacuation strategy to an emergency authority.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
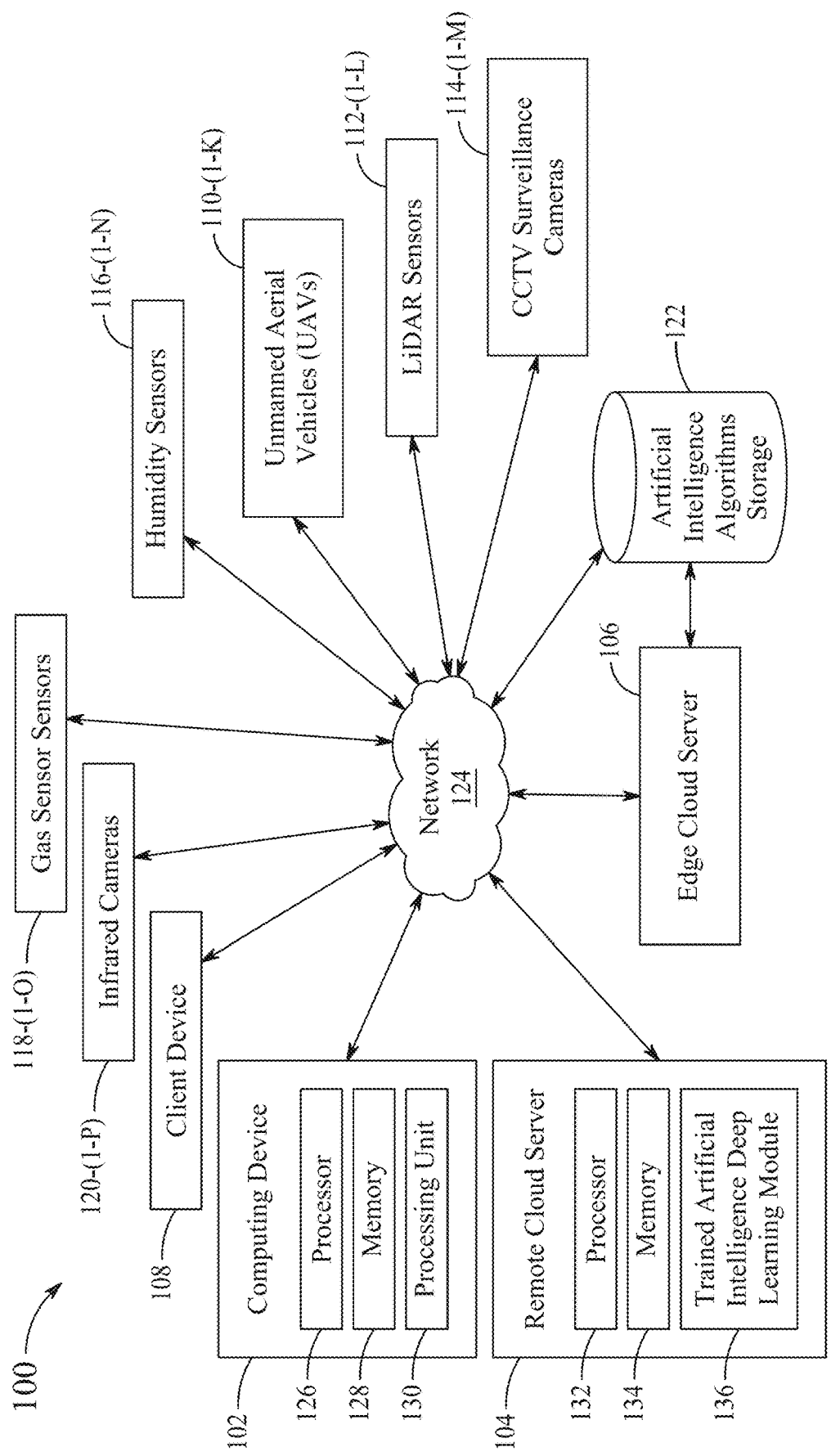
FIG. 1 illustrates a block diagram of a system for real-time crowd management in an area of interest, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and method for real-time crowd management in an area of interest. The present disclosure describes an Artificial Intelligence (AI) and a Visual Internet of Things (V-IoT) enabled real-time 3D visualization solution for crowd management. The system replaces the 2D cognition limited in a single shot in the traditional scheme by a global cognition of the 3D world.

FIG. 1 illustrates a block diagram of a system 100 for real-time crowd management in an area of interest, according to aspects of the present disclosure.

The system 100 includes a computing device 102, a remote cloud server 104, an edge cloud server 106, a client device 108, a plurality of unmanned aerial vehicles (UAVs) 110-(1-K), a plurality of LiDAR sensors 112-(1-L), a plurality of CCTV surveillance cameras 114-(1-M), a plurality of humidity sensors 116-(1-N), a plurality of gas sensors 118-(1-O), a plurality of infrared cameras 120-(1-P), an artificial intelligence algorithms storage 122, and a network 124 enabling communication between the system components for information exchange.

The remote cloud server 104, the edge cloud server 106, the plurality of UAVs 110-(1-K), the plurality of LiDAR sensors 112-(1-L), the plurality of CCTV surveillance cameras 114-(1-M), the plurality of humidity sensors 116-(1-N), the plurality of gas sensors 118-(1-O), and the plurality of infrared cameras 120-(1-P) may be in a periodic or continuous communication with the computing device 102 through the network 124.

The computing device 102 may be any device, such as a desktop computer, a laptop, a tablet computer, a smartphone, a smart watch, a mobile device, a Personal Digital Assistant (PDA) or any other computing device. The computing device 102 may operate in an offline mode. In some aspects, the computing device 102 may operate in an online mode. The computing device 102 may process data obtained from sensors, such as the plurality of LiDAR sensors 112-(1-L), the plurality of CCTV surveillance cameras 114-(1-M), the plurality of humidity sensors 116-(1-N), the plurality of gas sensors 118-(1-O), and the plurality of infrared cameras 120-(1-P). The computing device 102 may process the data using a variety of point cloud processing or 3D modeling algorithms such as LiDAR360, MeshLab, MassMotion, and Blender. In an example, the computing device 102 may be configured to generate 3D models of the ground, buildings, and trees using the point cloud processing or 3D modeling software.

Preferably at least one control sensor is mounted proximal to the CCTV so that it is in axial functional alignment (focus) with the CCTV and co-directional therewith. For example, a lens portion of the CCTV may be mounted on a base that can direct one or more lenses of the CCTV in X, Y, Z coordinates. The at least one control sensor is preferably in direct rigid physical connection with the lens. Additionally, the control sensor is displaced from the lens radially along the axis of the focus of the lens by 10 cm to 1 m, preferably 20 cm to 60 cm. Mounting the control sensor proximal to and with a direction of detection that is in axial alignment with the direction of focus of the CCTV provides accurate and directional information from the one of the more control sensors. Preferably the control sensor attached to the lens of the CCTV is one or more of an infrared camera and a LiDAR sensor.

Further, the computing device 102 has circuitry including a memory 128 storing program instructions and a processor(s) 126 configured to perform the program instructions. According to an aspect of the present disclosure, the processor 126 may be implemented as one or more microprocessors, microcomputers, microcontrollers, digital signal processors, central processing units, state machines, logic circuitries, and/or any devices that manipulate signals based on operational instructions. Among other capabilities, the processor 126 may be configured to fetch and execute computer-readable instructions stored in the memory 128. The memory 128 may be coupled to the processor 126 and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes.

The computing unit 102 further includes a processing unit 130 that may be coupled to the processor 128 and the memory 126. The processing unit 130, amongst other units, may include routines, programs, objects, components, data structures, etc., which may perform particular tasks or implement particular abstract data types. The processing unit 130 may also be implemented as, signal processor(s), state machine(s), logic circuitries, and/or any other device or component that manipulate signals based on operational instructions.

In some aspects, the processing unit 130 may be implemented in hardware, instructions executed by a processing module, or by a combination thereof. The processing module may comprise a computer, a processor, a state machine, a logic array or any other suitable devices capable of processing instructions. The processing module may be a general-purpose processor that executes instructions to cause the general-purpose processor to perform the required tasks or, the processing unit may be dedicated to performing the required functions. In some aspects, the processing unit 130 may be machine-readable instructions that, when executed by a processor/processing unit, perform any of desired functionalities. The machine-readable instructions may be stored on an electronic memory device, hard disk, optical disk or other machine-readable storage medium or non-transitory medium. The machine-readable instructions may also be downloaded to the storage medium via a network connection. In an example, machine-readable instructions may be stored in memory 128.

The remote cloud server 104 and the edge cloud server 106 may be implemented as a part of a cluster of servers. In some aspects, the remote cloud server 104 and the edge cloud server 106 may be implemented across a plurality of servers, thereby, tasks performed by the remote cloud server 104 and the edge cloud server 106 may be performed by the plurality of servers. These tasks may be allocated among the cluster of servers by an application, a service, a daemon, a routine, or other executable logic for task allocation. The remote cloud server 104 may have a high computing power and the edge cloud server 106 may have a low computing power.

The edge cloud server 106 may receive data from the plurality of LiDAR sensors 112-(1-L), the plurality of CCTV surveillance cameras 114-(1-M), the plurality of humidity sensors 116-(1-N), the plurality of gas sensors 118-(1-O), and the plurality of infrared cameras 120-(1-P) through the network 124. The edge cloud server 106 may process the data and transmit the processed data to the remote cloud server 104 for further processing.

The remote cloud server 104 has circuitry including a memory 134 storing program instructions and a processor(s) 132 configured to perform the program instructions. According to an aspect of the present disclosure, the processor 132 may be implemented as one or more microprocessors, microcomputers, microcontrollers, digital signal processors, central processing units, state machines, logic circuitries, and/or any devices that manipulate signals based on operational instructions. Among other capabilities, the processor 132 may be configured to fetch and execute computer-readable instructions stored in the memory 134. The memory 134 may be coupled to the processor 132 and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The remote cloud server 104 further includes a trained artificial intelligence deep learning module 136 that may be coupled to the processor 132 and the memory 134.

The artificial intelligence algorithms storage 122 may store a plurality of AI algorithms. The artificial intelligence algorithms storage 122 may be accessed by the edge cloud server 106 as and when required. Information related to the plurality of AI algorithms stored in the artificial intelligence algorithms storage 122 may be periodically or dynamically updated as required. Although, it has been shown that the artificial intelligence algorithms storage 122 is external to the edge cloud server 106, in one aspect, the artificial intelligence algorithms storage 122 may be implemented within the edge cloud server 106.

Referring again to FIG. 1, the client device 108 may be any device that may be owned or managed or otherwise associated with an emergency authority, an emergency personnel, a client device owner, or any entity authorized thereof. The client device 108 may be any computing device, such as a desktop computer, a laptop, a tablet computer, a mobile device, a Personal Digital Assistant (PDA), or any other computing device. The client device 108 may include any of the operating systems, such as Windows, Linux, Android, iOS, etc.

The term "emergency authority" is defined as at least one of a police department, a fire department, a hospital, a control center which monitors the crowd, and the like. In the United States, the emergency authority may be notified by calling 911 and reporting the emergency.

The client device 108 may also include a user interface, such as a keyboard, a mouse, a touch screen, a haptic sensor, a voice-based input unit, or any other appropriate user interface. The client device 108 may also include a display, such as a screen, a monitor connected to the device in any manner, or any other appropriate display. The client device 108 may receive real-time dynamic 3D data from the computing device 102 for visualization. In an example, real-time 3D animation including static environment (ground, buildings, and trees), moving people or objects (pedestrians and vehicles), and special effects (fire, rain, and snow) may be displayed on the client device 108. Further, areas of abnormal events may be framed, with some text displayed on the side indicating event type and severity. A variety of charts can be used to present information (e.g., a line chart showing the total number of people at different times during the day). Further, a user of the client device 108 interact with a scene in a gamification way to realize real-time simulation. The user may use a game engine and crowd or traffic simulation engine, to realize real-time simulation. The user is enabled to freely explore the scene by dragging or other gamification ways so that a better user experience can be obtained. In an example, after opening a scene, the user can freely explore the scene and change perspective and drag to add new people or objects, move existing people or objects, and observe next event. In a non-limiting example, the game engine may be Unity, which is Unity is a cross-platform game engine developed by Unity Technologies, first announced and released in June 2005 by Apple Inc. The engine has since been gradually extended to support a variety of desktop, mobile, console and virtual reality platforms. In a non-limiting example, the traffic simulation engine may be the MassMotion simulation software, available from Oasys, http://www.oasys-software.com/.

The engine can be used to create three-dimensional (3D) and two-dimensional (2D) games, as well as interactive simulations and other experiences.

The plurality of UAVs 110-(1-K), the plurality of LiDAR sensors 112-(1-L), the plurality of CCTV surveillance cameras 114-(1-M), the plurality of humidity sensors 116-(1-N), the plurality of gas sensors 118-(1-O), and the plurality of infrared cameras 120-(1-P) may be deployed in an area of interest, and may be configured to collect multimodal data. Further, the plurality of UAVs 110-(1-K) and the plurality of LiDAR sensors 112-(1-L) may be offline sensors that acquire relatively static data that hardly changes over time. The plurality of CCTV surveillance cameras 114-(1-M), the plurality of humidity sensors 116-(1-N), the plurality of gas sensors 118-(1-O), and the plurality of infrared cameras 120-(1-P) may be fixed or mobile (airborne/onboard) IoT sensors that acquire the continuously changing multimodal data.

The plurality of UAVs 110-(1-K) may be configured to fly within the area of interest. Each LiDAR sensor of the plurality of LiDAR sensors 112-(1-L) may be located in one of the plurality of UAVs 110-(1-K), where each LiDAR sensor is configured to generate point cloud data (interchangeably referred to as LiDAR point cloud data. Further, the plurality of CCTV surveillance cameras 114-(1-M) may be located in the area of interest. Each CCTV surveillance camera of the plurality of CCTV surveillance cameras 114-(1-M) may be is configured to take images of the area of interest and generate CCTV image data. In an example, the CCTV image data may be used for crowd tracking, crowd counting, and abnormal event detection. In an example, abnormal events include fighting, shooting, robbery, etc.

The plurality of humidity sensors 116-(1-N) may be located in the area of interest. Each humidity sensor of the plurality of humidity sensors 116-(1-N) may be configured to detect water content of air in the area of interest and generate humidity sensor data. In an example, the humidity sensor data may be used to detect rain, snow, fog, etc. The plurality of gas sensors 118-(1-O) may be located in the area of interest. Each gas sensor of the plurality of gas sensors 118-(1-O) may be configured to detect a specific gas in the air of the area of interest, and generate gas detection data. Examples of gas sensors may include smoke alarms and fire-related gas concentration sensors, such as carbon monoxide concentration sensors.

The plurality of infrared cameras 120-(1-P) may be located in the area of interest. Each infrared camera of the plurality of infrared cameras 120-(1-P) may be configured to thermally image the area of interest, and generate thermal image data. The thermal image data and the gas detection data together may be used for fire detection. A tabular representation of a set of sensor data is illustrated in Table 1 provided below.

TABLE 1

Set of sensor data

| Sensors | Sensor data | Data processing | Processing result | Display |
|---|---|---|---|---|
| Airborne LiDAR and camera | Colored point cloud | 3D model generation | 3D models | Display 3D models of the ground, buildings, and trees |
| Camera | Video | Head tracking | Head positions of each frame | Display 3D animation of people walking |
| Camera | Video | Object tracking | Object positions of each frame | Display 3D animation of objects (e.g., vehicles moving) |
| Camera | Video | Abnormal behavior detection | Types and locations of abnormal events if they exist | Frame the areas and display text |
| Camera and gas sensors | Video | Fire detection | Location of fire if it exists | Display fire |

The network 124 may be a wireless network, a wired network (a user device connected to an internet device in an automobile through wires), or a combination thereof. The network 124 may also be an individual network or a collection of many such individual networks, interconnected with each other and functioning as a single large network, e.g., the Internet or an intranet. The network 124 may be implemented as one of the different types of networks, such as intranet, local area network (LAN), wide area network (WAN), the internet, and the like. The network 124 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 124 may include a variety of network devices, including routers, bridges, servers, computing devices, storage devices, and the like.

In operation, the computing device 102 is configured to receive LiDAR point cloud data from the plurality of LiDAR sensors 112-(1-L), CCTV image data from the plurality of CCTV surveillance cameras 114-(1-M), humidity sensor data from the plurality of humidity sensors 116-(1-N), gas detection data from the plurality of gas sensors 118-(1-O), and thermal image data from the plurality of infrared cameras 120-(1-P). In an example, the CCTV image data may include real-time CCTV camera images of the area of interest.

The computing device 102 may then process the LiDAR point cloud data, the CCTV image data, the humidity sensor data, the gas detection data, and the thermal image data to generate a real-time dynamic 3D model of the area of interest. The thermal image data may include thermal images. In an aspect, the computing device 102 may generate a 3D static surface model of the area of interest from the LiDAR point cloud data. The computing device 102 may add the real-time CCTV camera images to the 3D static surface model to generate the real-time dynamic 3D model. In an aspect, the computing device 102 may update the real-time dynamic 3D model with the gas sensor data, the humidity sensor data, and the thermal image data.

The computing device 102 may identify a plurality of dynamic objects in the real-time dynamic 3D model. The computing device 102 may generate a density map of the area of interest based on the plurality of dynamic objects in the real-time dynamic 3D model. Thereafter, the computing device 102 may add the density map to the real-time dynamic 3D model. The computing device 102 may identify which dynamic objects are people. Further, the computing device 102 may replace each person with an animated character and display the real-time dynamic 3D model.

The computing device 102 may assign an identification ID to each person. Further, the computing device 102 may determine a 3D position of each person from a GPS location of each person shown on the density map. The computing device 102 may represent the animated character of the person by the ID and the 3D position.

The computing device 102 may monitor the real-time dynamic 3D model in the area of interest for dangerous situations. According to an aspect, the computing device 102 may simulate an evacuation of the area of interest by manipulating the animated characters onto pathways leading away from the area of interest. Further, the computing device 102 may generate an evacuation strategy for the crowd. The computing device 102 may transmit a notice of the dangerous situation and the evacuation strategy to an emergency authority. In some aspects, the computing device 102 may assign velocity attributes to each animated character and simulate a dangerous situation in the area of interest. The computing device 102 may change the 3D position and velocity attribute of each animated character to simulate the evacuation of the crowd from the area of interest.

In an example, the computing device 102 may identify which dynamic objects are moving vehicles. The computing device 102 may then replace each moving vehicle with an animation of a moving vehicle and display the real-time dynamic 3D model with the animated characters and the animations of the moving vehicles. The computing device 102 may monitor the real-time dynamic 3D model of the area of interest for potential collisions between the animated characters and the animations of the moving vehicles. In response to detecting a potential collision, the computing device 102 may simulate an evacuation of the area of interest by manipulating the animated characters onto pathways leading away from the potential collision. The computing device 102 may then generate an evacuation strategy for the crowd and transmit a notice of the dangerous situation and the evacuation strategy to an emergency authority.

In an example, the computing device 102 may simulate a fire as the dangerous situation. The computing device 102 may control the progression of the simulated fire and simulate the evacuation of the crowd along pathways leading away from the fire. In another example, the computing device 102 may simulate an overcrowded region as the dangerous situation and form an evacuation strategy for the overcrowded region. Further, the computing device 102 may simulate an intervention by emergency personnel. The computing device 102 may simulate the evacuation of the crowd by the emergency personnel along pathways leading away the overcrowded region.

In some aspects, the computing device 102 may identify regions of the density map which have a density of people greater than a predefined threshold. The computing device 102 may trigger a danger warning when the density of people is greater than the threshold. Further, the computing device 102 may dispatch UAVs to each of the regions to collect additional LiDAR point cloud data of the regions. The computing device 102 may then add the additional LiDAR point cloud data to the real-time dynamic 3D model. Thereafter, the computing device 102 may monitor each region for dangerous situations and generate an evacuation strategy for each region when a dangerous situation is detected. The computing device 102 may transmit a notice of the dangerous situation and the evacuation strategy to an emergency authority.

In an aspect, the edge cloud server 106 may be configured to receive the LiDAR point cloud data from the plurality of LiDAR sensors 112-(1-L), the CCTV image data from the plurality of CCTV surveillance cameras 114-(1-M), the humidity sensor data from the plurality of humidity sensors 116-(1-N), the gas detection data (also referred to as gas sensor data) from the plurality of gas sensors 118-(1-O), and the thermal image data from the plurality of infrared cameras 120-(1-P). In an example, the CCTV image data, the humidity sensor data, the gas detection data, and the thermal image data may be real-time data. Further, the edge cloud server 106 may be configured to receive the real-time dynamic 3D model from the computing device 102.

The edge cloud server 106 may be configured to pre-process the LiDAR point cloud data, the CCTV image data, the humidity sensor data, the gas detection data, and the thermal image data to generate a packet of pre-processed data. The edge cloud server 106 may then transmit the pre-processed data to the remote cloud server 104. Upon receiving the pre-processed data, the trained artificial intelligence deep learning module 136 located in the remote cloud server 104 may be configured to generate an analysis of the dangerous situations. Further, the trained artificial intelligence deep learning module 136 may generate the evacuation strategy for the crowd based on the analysis. The trained artificial intelligence deep learning module 136 may then transmit the evacuation strategy to the computing device 102.

In an aspect, the trained artificial intelligence deep learning module 136 may determine crowd density by counting the animated characters in the area of interest. Further, the trained artificial intelligence deep learning module 136 may determine crowd speed by averaging the velocities of the animated characters. The trained artificial intelligence deep learning module 136 may also determine crowd direction by identifying an average movement of the plurality of animated characters based on changes in the 3D position of each animated character.

In some aspects, the edge cloud server 106 may be configured to receive the LiDAR point cloud data from the plurality of LiDAR sensors 112-(1-L) and the CCTV image data including real-time CCTV camera images from the plurality of CCTV surveillance cameras 114-(1-M). In response to receiving the LiDAR point cloud data and the CCTV image data, the edge cloud server 106 may generate the density map and the real-time dynamic 3D model using artificial intelligence algorithms stored in the artificial intelligence algorithms storage 122. Further, the edge cloud server 106 may be configured to generate a data packet including the LiDAR point cloud data, the CCTV image data, the density map, and the real-time dynamic 3D model. The edge cloud server 106 may transmit the data packet to the remote cloud server 104. Upon receiving the data packet, the trained artificial intelligence deep learning module 136 of the remote cloud server 104 may form the evacuation strategy.

Examples and Experiments

The following examples are provided to illustrate further and to facilitate the understanding of the present disclosure.

Experimental Data and Analysis

Three experiments are conducted to verify the 3D visualization, real-time monitoring, and simulation functionalities of the system 100. The experiments are carried out on the 3D game engine, Unity (supporting programming in C# language) of the Windows 10 operating system.

First Experiment: 3D Modeling Based on Point Cloud Data

For the first experiment, a copy of colored point cloud sample data captured by an airborne UAV having LiDAR sensors was downloaded from the official website of a LiDAR manufacturer. In a non-limiting example, the LiDAR manufacturer may be Green Valley International, 2120 University Ave., Berkeley, Calif., United States. Three problems are detected in the point cloud sample data.
1) Buildings had roofs but no walls.
2) There were holes on the ground under the roofs
3) Tree point clouds were usually incomplete as they included only the tops of the crowns, thus lacking the remainder of the crowns and trunks.

These problems may be caused due to the fact that when a UAV is flying high above, the LiDAR signal is blocked by the roofs, and therefore unable to reach walls and ground under the roofs. To resolve the three problems stated above, the point cloud sample data was processed using the following steps.

Step 1—Point cloud classification: The point cloud processing software, LiDAR360 was used to divide the point cloud sample data into the ground and buildings, and other points, such as trees, were removed.

Step 2—Mesh generation: The 3D processing software, Magic3D was used to generate mesh from the ground and buildings point clouds, respectively.

Step 3—Fixing holes: The 3D processing software, Mesh-Lab was used to repair the holes on the ground model.

Step 4—Creating Walls: The crowd simulation software, MassMotion was used to pull down the roofs vertically to form walls.

Step 5—Texturing: 3D modeling software, Blender was used to texture the ground and buildings.

Step 6—Adding tree models: The 3D game engine, Unity was used to place tree models where there should be trees.

Figure 2A:
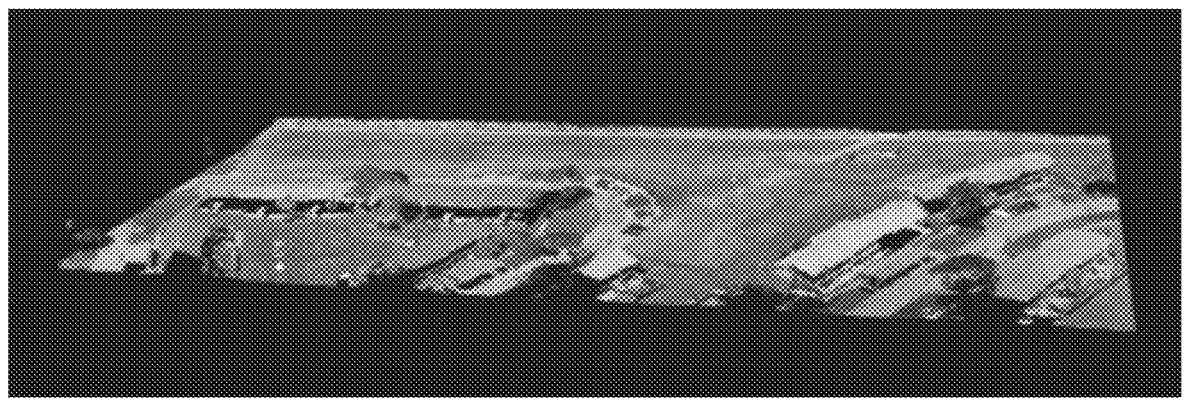
FIG. 2A illustrates an example of 3D modeling of a scene based on point cloud data processing, according to aspects of the present disclosure.
Figure 2B:
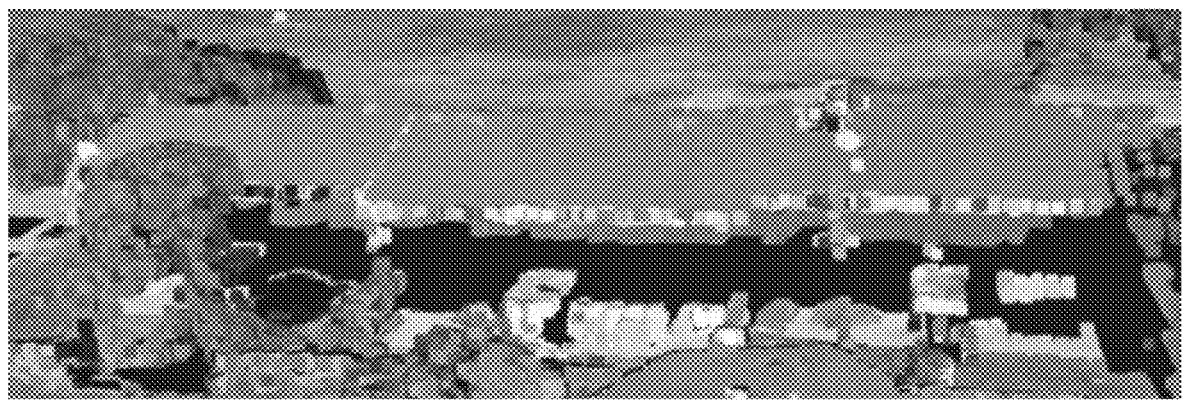
FIG. 2B illustrates an example of a part of the scene, according to aspects of the present disclosure.
Figure 2C:
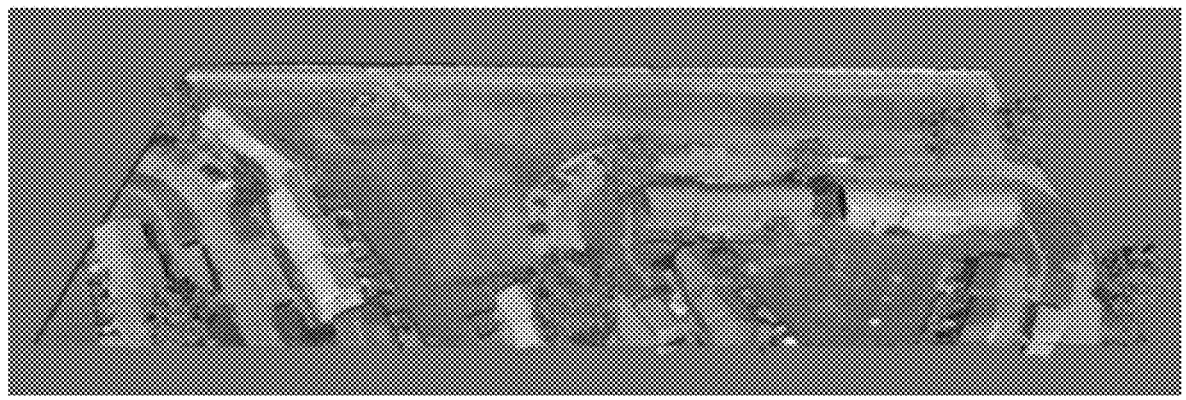
FIG. 2C illustrates an example of a resulting 3D model of the scene, according to aspects of the present disclosure.
Figure 2D:
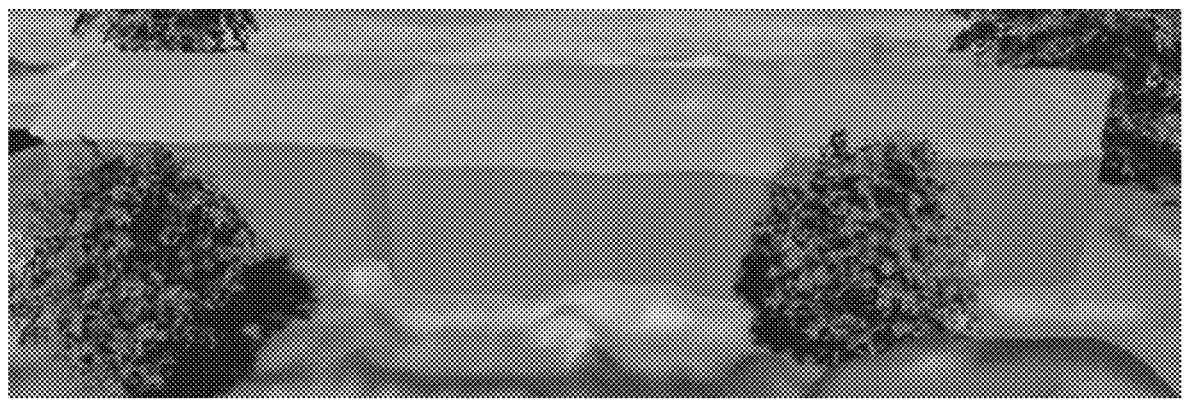
FIG. 2D illustrates an example of another part of the resulting 3D model of the scene, according to aspects of the present disclosure.

FIGS. 2A to 2D illustrate 3D modeling of a scene (static environment including ground, buildings, and trees) based on point cloud data processing. In particular, FIG. 2A illustrates an example 202 of original point cloud data, FIG. 2B illustrates an example 204 of a part of the original point cloud data, FIG. 2C illustrates an example 206 of a resulting 3D model of the original point cloud data, and FIG. 2D illustrates an example 208 of a part of the resulting 3D model of the original point cloud data. By processing the ground, buildings, and trees separately, the three problems of lacking walls, ground holes, and incomplete trees in the original data cloud data are resolved with minimal manual work.

Second Experiment: Crowd Display Based on Video Data

The objective of the second experiment was to display the crowd movement from a CCTV video in the form of 3D animation, including crowd density, crowd speed, crowd direction, etc. A video representing Hajj scene was collected by a CCTV camera. Initially, an AI algorithm such as CSRNet based head tracking was used to output the ID and 2D coordinates of each person in each frame using a UCF-QNRF dataset, in which 1201 samples are used for training and 334 samples are used for testing. A head-tracking algorithm was used to obtain a specific position of each head in each frame and match the same heads in different frames. To determine head positions, the number of people in each window of each frame was counted according to the density map. Then if 'x' heads were found in the window, it was considered that these 'x' heads are in the pixels with the highest density inside the window. To match the same heads in different frames, it was assumed that the heads closest to each other in two adjacent frames are the same head.

Subsequently, the 2D coordinates were converted to 3D coordinates. Visual measurement was carried out to measure how many meters each pixel corresponds to, and then an affine transformation was carried out for coordinate conversion. Thereafter, roadblocks were manually added into the scene to make the 3D animation closer to the video. Finally, with the game engine, Unity, in each frame, each person was displayed with walking animation at the position provided by the AI algorithm. In some examples, LiDAR point cloud with GPS data and CCTV camera parameters (e.g., position, rotation, and lens parameters) was used for an accurate conversion of 2D coordinates to 3D coordinates. Also, object detection algorithms may be used for automatic addition of the road blocks.

Figure 3A:
FIG. 3A illustrates an example of original video screenshot, according to aspects of the present disclosure.
Figure 3B:
FIG. 3B illustrates an example of a density map based on the video screenshot, according to aspects of the present disclosure.
Figure 3C:
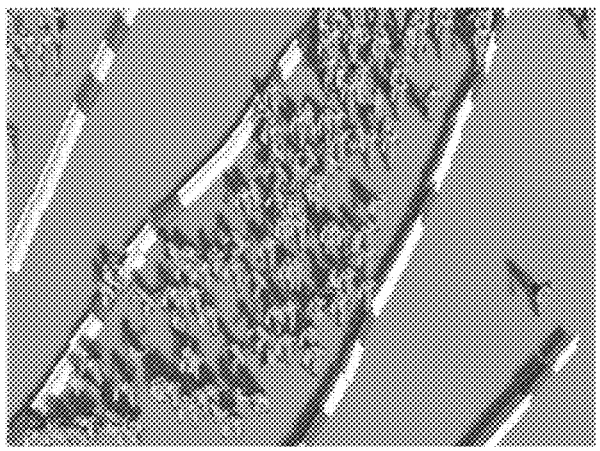
FIG. 3C illustrates a simulation of the density map, where the people in the crowd have been replaced by animations, according to aspects of the present disclosure.

FIGS. 3A to 3C illustrate a result of crowd display based on video data. In particular, FIG. 3A illustrates an example 302 of original video screenshot (frame 334), FIG. 3B illustrates an example 304 of a density map calculated based on the frame, and FIG. 3C illustrates an example 306 of 3D animation in the game engine, Unity, based on the density map.

As shown in FIG. 3A and FIG. 3B, in terms of crowd density distribution, the density map was close to the original video. The crowd was primarily distributed between the roadblocks, and the upper center is less crowded. However, there were a few errors in the density map. According to the density map, there were 492 people in the frame, while a manual count in the video showed only 324. For the 334 testing video samples, the mean absolute error (MAE) and the mean square error (MSE) of the AI algorithm are 119.40 and 214.56, respectively, in terms of crowd counting.

As shown in FIG. 3B and FIG. 3C, character positions in the 3D animation are completely consistent with the density map. However, some character models overlap with each other in the 3D animation, which may have been caused by the inaccuracy of coordinate conversion algorithm based on artificial visual inspection rather than real data. The issue may be solved once the infrastructure (UAV with LiDAR and CCTV) is established so that the required parameters (camera location, rotation, lens parameters, etc.) can be provided.

To locate a point in the real world using a 3D rectangular coordinates system, three parameters: x, y, and z coordinates are used. When each coordinate was recorded by a camera, to locate the corresponding pixel, two parameters: i and j (indicating which column and which row this pixel is in, respectively) were used. The objective of the coordinate conversion was to convert the i and j in an image, to the x, y, and z in the 3D world. In practice, people or objects can only stand on the ground rather than floating in the air or sinking into the earth. Therefore, when the 3D model of the ground was built, y coordinates (height) were ignored.

Further, each person was described by his/her ID and 3D position. As described above, people must be right on the ground, so that their height (y) can be ignored, and only two parameters (x, z) are necessary for 3D positions. It was assumed that maximum of 20,000 people can be in the scene, and the position precision was 0.1 m. For each person, 2 bytes are used for the ID, 4 bytes are used for the 3D position (2 for x and 2 for z so that the maximum ground size is 6553.5 m×6553.5 m). Further, it was assumed that the communication frequency was 1 fps, since people cannot move quickly in a dense crowd and hence cannot walk a long distance within 1 s. In such case, for each person, 6 bytes are required, and for every second, there are 20,000 people, which makes the total communication rate 117.1875 kB/s (120000 B/s). This requirement was much lower even when compared to the 4G network. Also, the average time taken to calculate the head tracking result of a frame was 0.41317 s with NVIDIA V100 GPU, which is much faster than the required frame rate, i.e., 1 fps.

Third Experiment—Crowd Evacuation Simulation Based on MassMotion

A crowd emergency evacuation simulation can provide decision support for an emergency authority in an intuitive way. The objective of the third experiment was to display the crowd evacuation simulation in a fire scene in the form of 3D animation, including the crowd, fire, vehicles, and paths. At the same time, the fire area was framed, and corresponding text was displayed. Based on the starting points and destinations set by users, the crowd simulation software, MassMotion was used to provide evacuation simulation results (1D and 3D coordinates of each person in each frame). At the same time, MassMotion was used to provide a software development kit (SDK) in C# programming language. The game engine, Unity was used to support the display of fire, paths, text, and other elements, and provide interaction interfaces in a gamification way (e.g., dragging and selecting a certain area). Further, application programming interfaces (APIs) of the MassMotion SDK were used to display the simulation results in game engine, Unity.

Figure 4A:
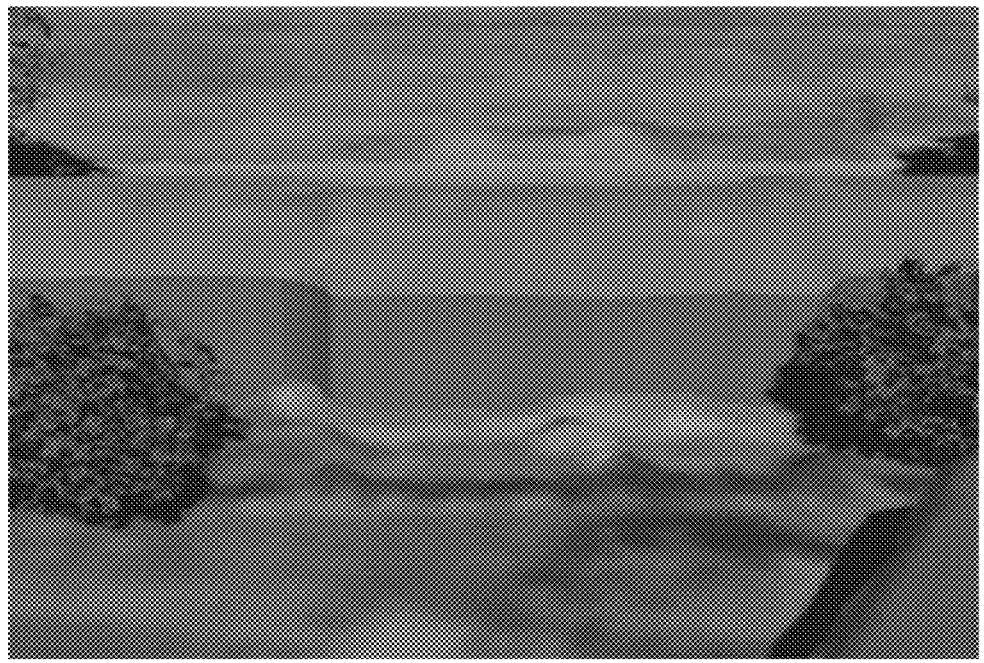
FIG. 4A illustrates an example of a simulated region without fire, according to aspects of the present disclosure.
Figure 4B:
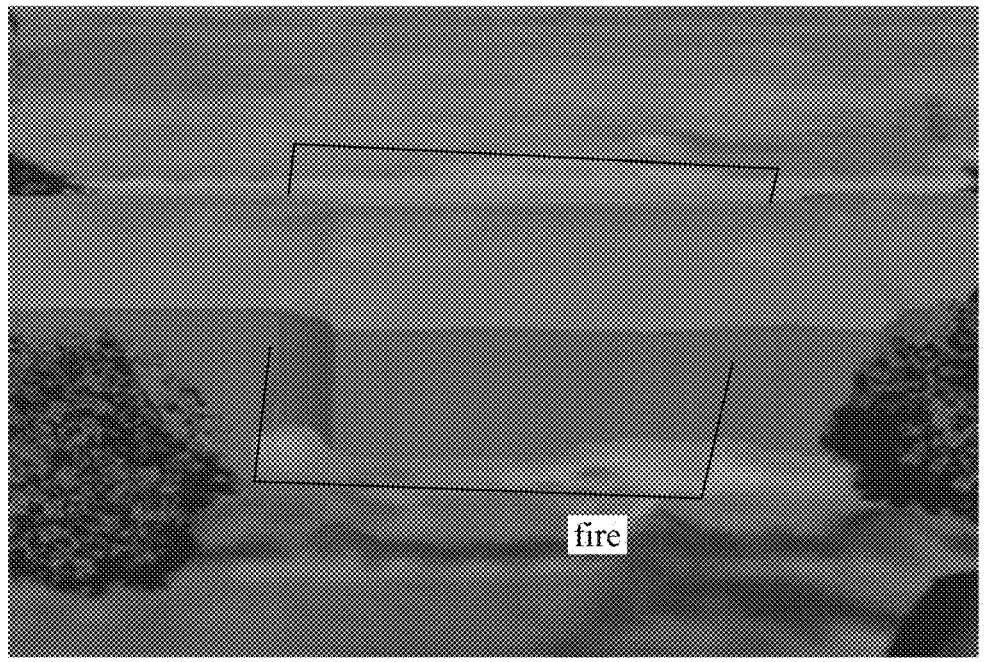
FIG. 4B illustrates a simulated initial phase of a fire in the simulated region according to aspects of the present disclosure.
Figure 4C:
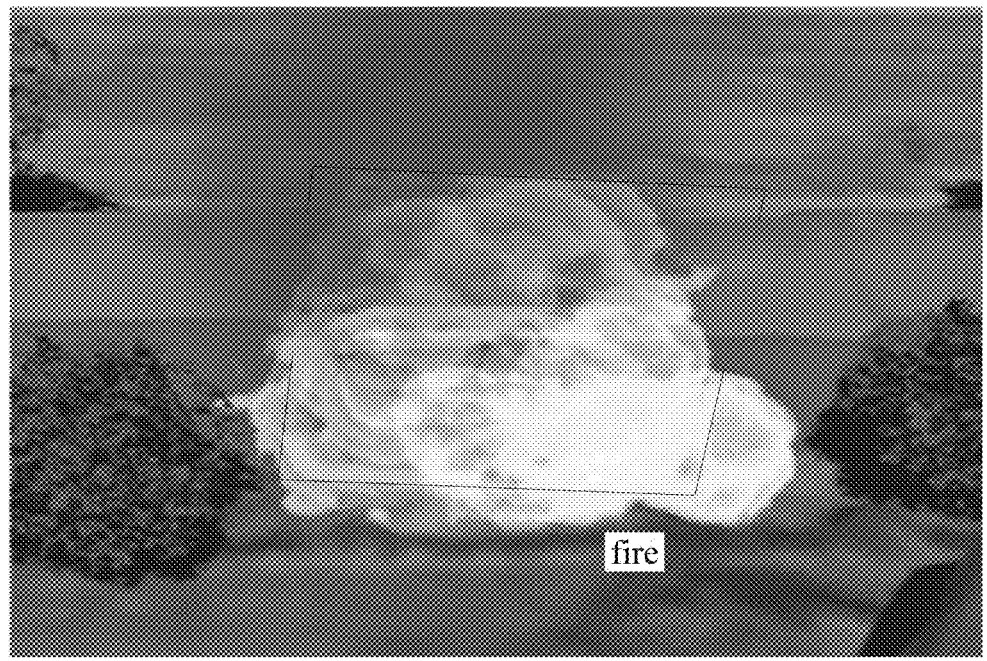
FIG. 4C illustrates a simulated fully developed phase of the fire in the simulated region, according to aspects of the present disclosure.
Figure 4D:
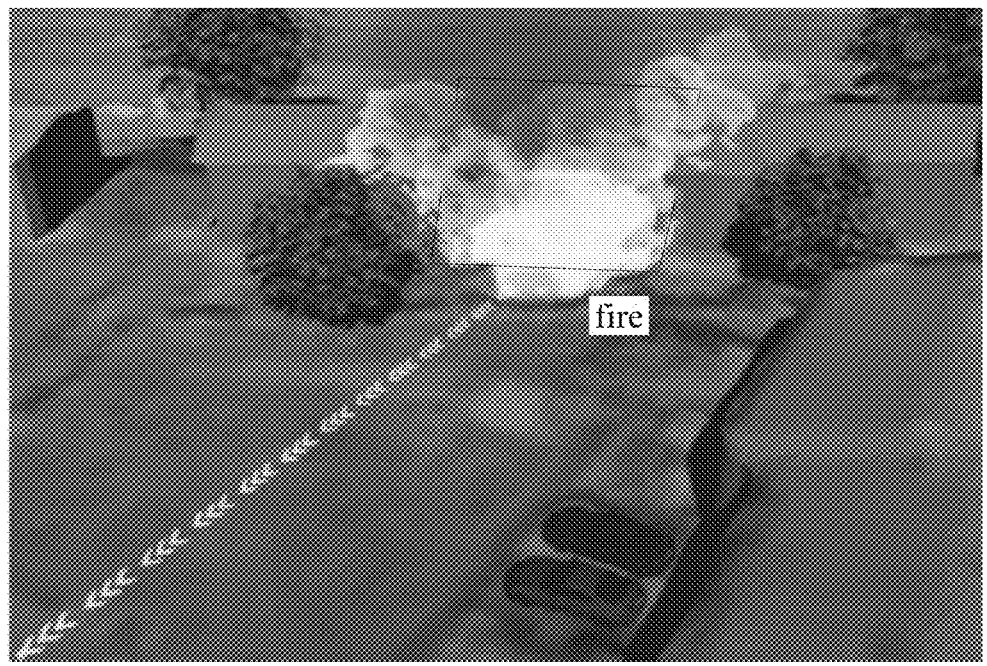
FIG. 4D illustrates a simulation of an evacuation route, according to aspects of the present disclosure.
Figure 4E:
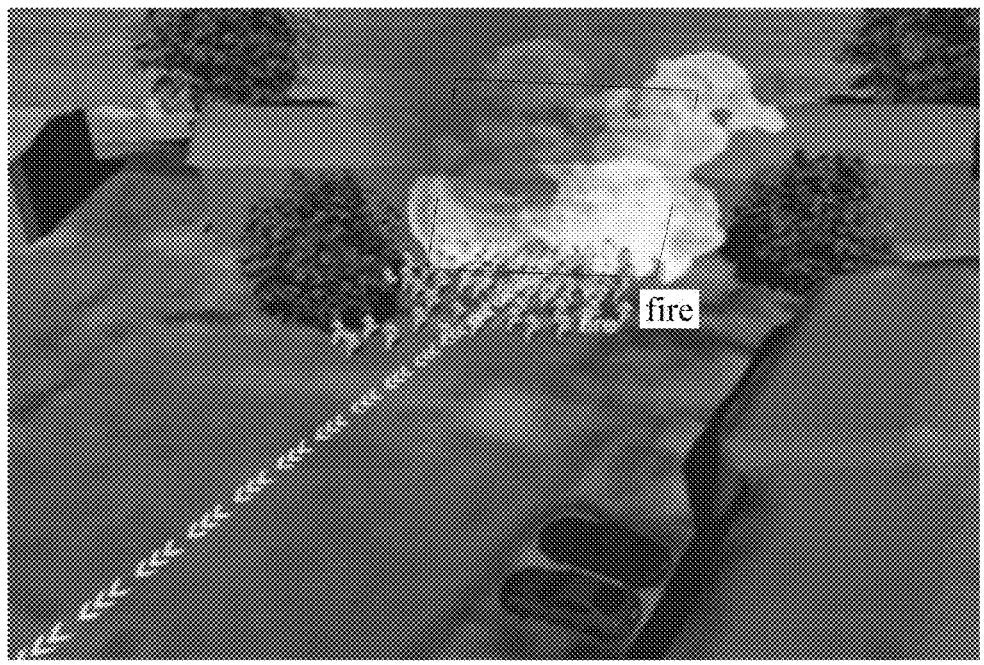
FIG. 4E illustrates a simulation of the animations starting to evacuate, according to aspects of the present disclosure.
Figure 4F:
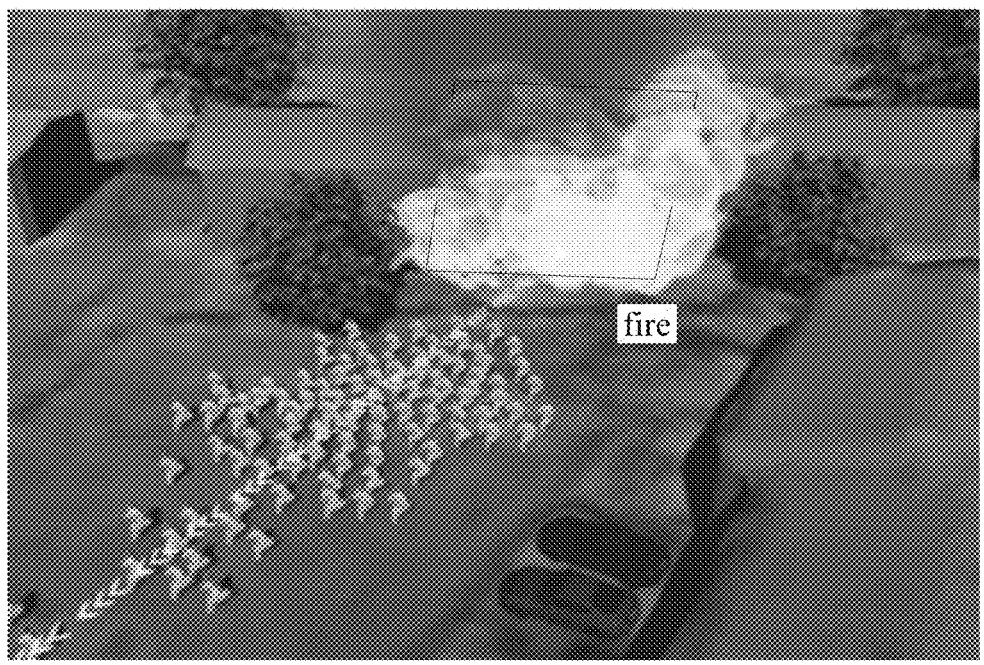
FIG. 4F illustrates a scene of the animations evacuating along an evacuation route, according to aspects of the present disclosure.
Figure 5A:
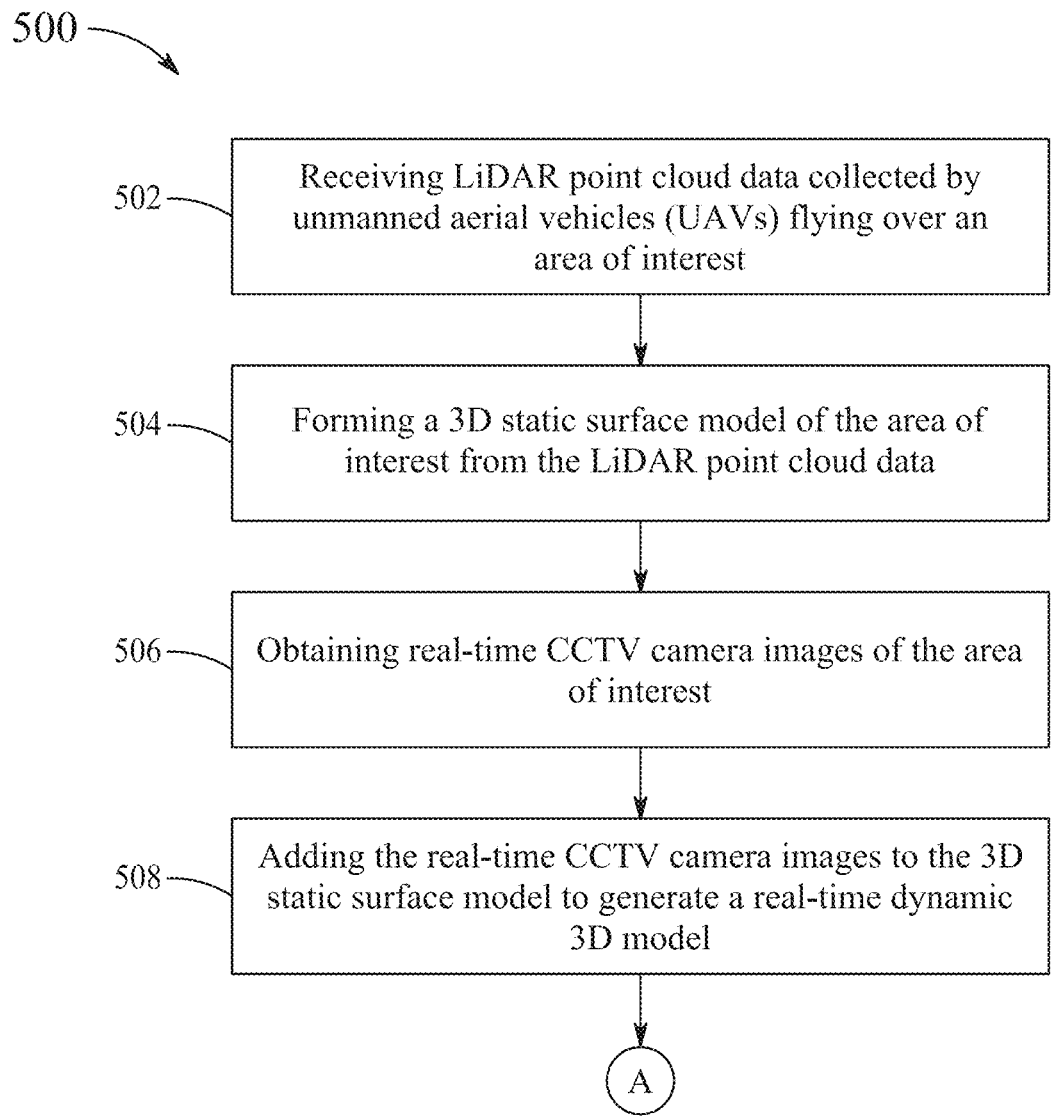
FIG. 5A is a flowchart for collecting data and generating a real-time dynamic 3D model, according to aspects of the present disclosure.
Figure 5B:
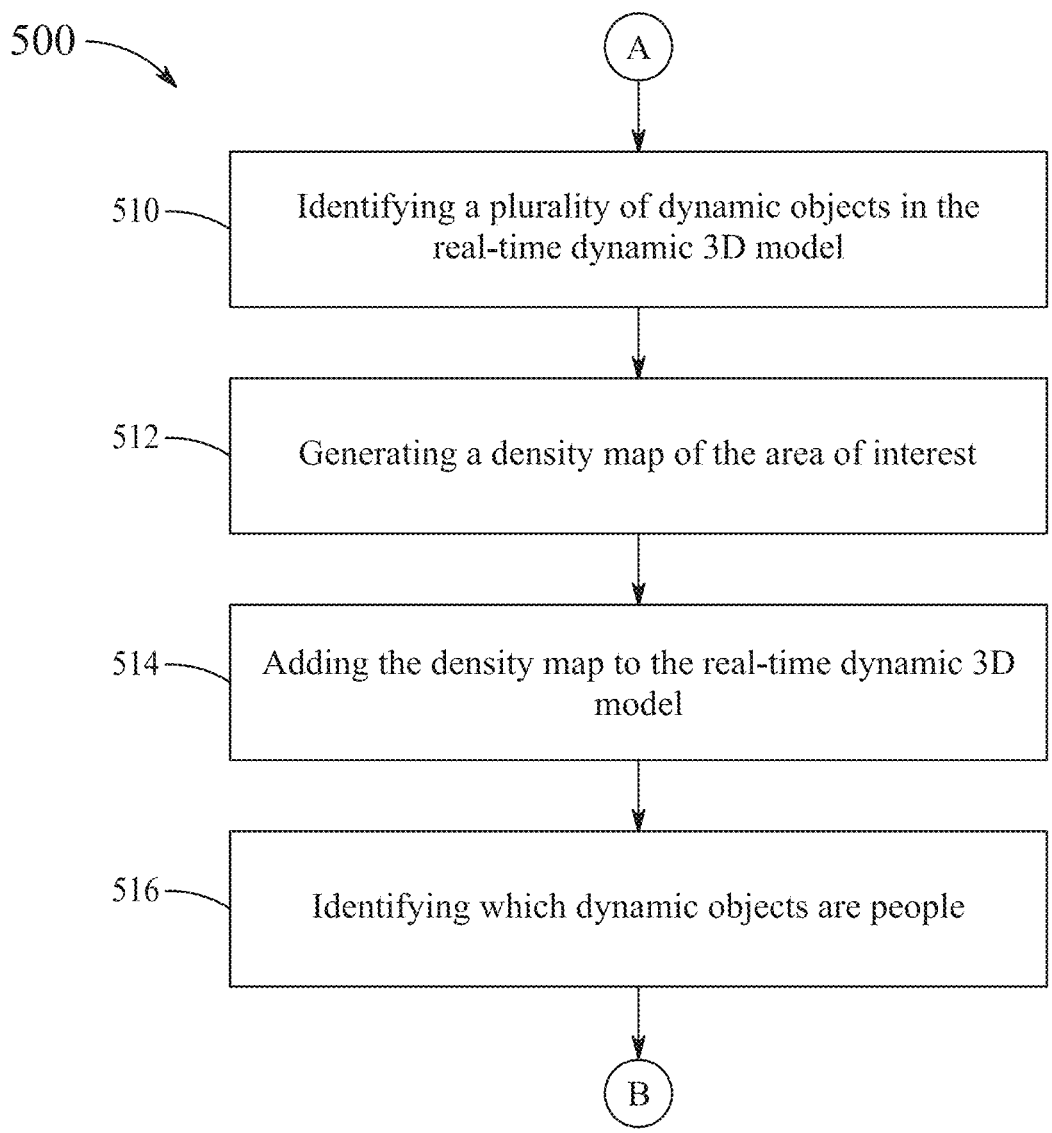
FIG. 5B is a flowchart for generating a density map, according to aspects of the present disclosure.
Figure 5C:
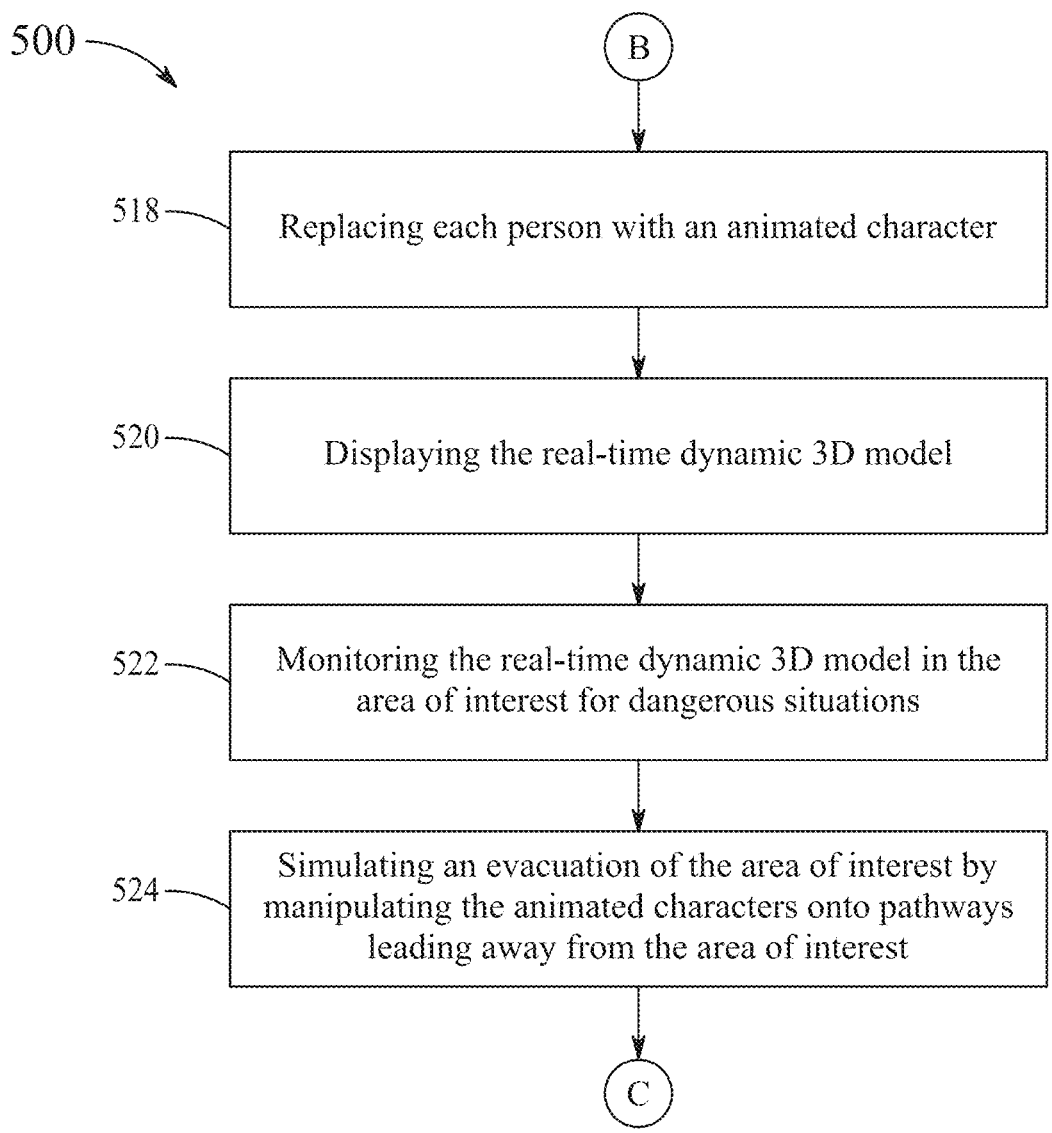
FIG. 5C is a flowchart for replacing the people in the crowd with animations and simulating an evacuation route, according to aspects of the present disclosure.
Figure 5D:
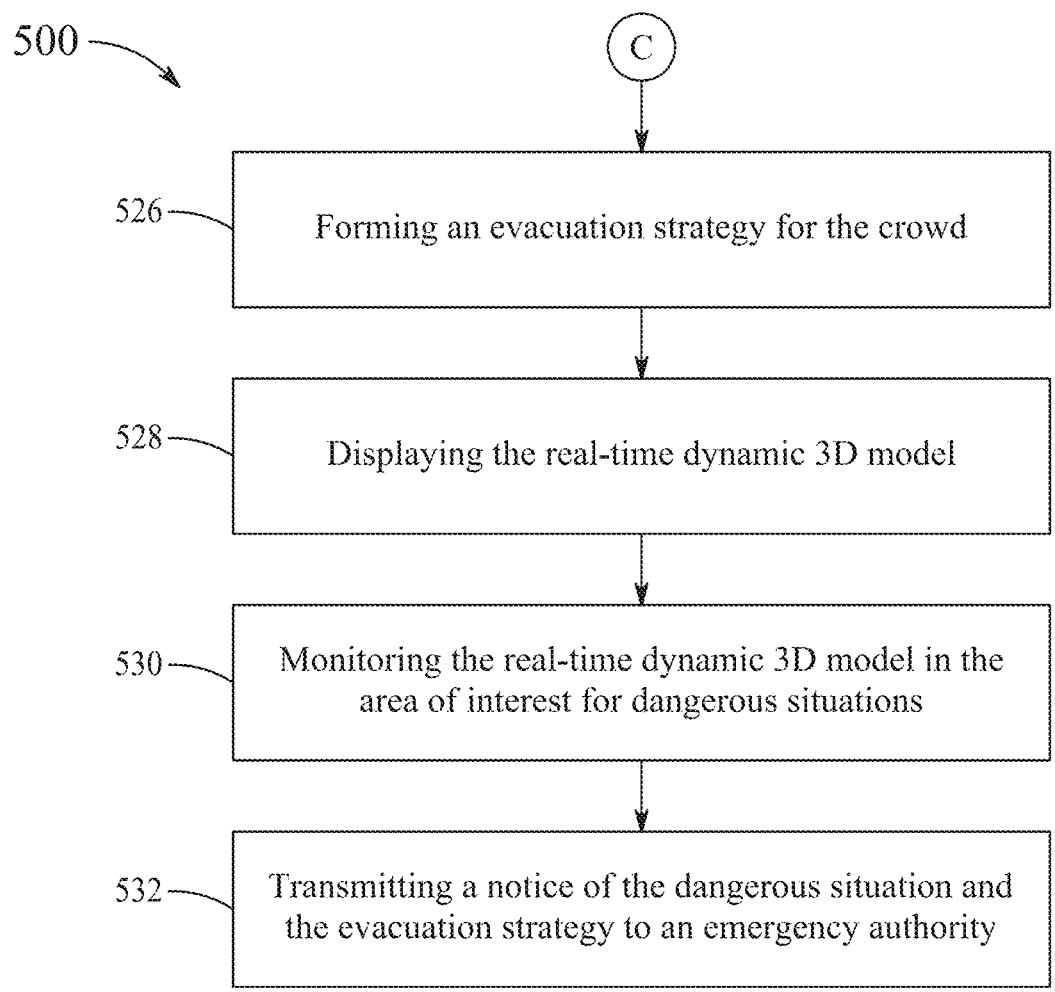
FIG. 5D is a flowchart for transmitting a notice of a dangerous system to an emergency authority, according to aspects of the present disclosure.

FIGS. 4A to 4F illustrate an evacuation simulation of a fire scenario based on MassMotion. In particular, FIG. 4A illustrates an example 402 of a scenario without fire, FIG. 4B illustrates a scene 404 of an initial phase of a fire, FIG. 4C illustrates a scene 406 of a result of the developed phase of the fire, FIG. 4D illustrates a scene 408 of an evacuation route, FIG. 4E illustrates a scene 410 where people start to evacuate, and FIG. 4F illustrates a scene 412 of people evacuating.

FIG. 4A shows the scenario before a fire has started. A user can use a mouse pointer to click some points as the area boundary, and set a fire, as shown in FIG. 4B and FIG. 4C. The user can then set the evacuation route, as shown in FIG. 4D. After that, the animation of the crowd evacuation according to the route set by the user may be displayed (as shown in FIG. 4E and FIG. 4F. From the result, it was observed that the system 100 provides functionalities, such as gamification interaction and crowd evacuation simulation, and enhanced visual effect and user experience through realistic 3D animation display.

FIGS. 5A to 5D illustrate a method 500 for real-time crowd management, according to aspects of the present disclosure.

At step 502, the method 500 includes receiving LiDAR point cloud data collected by unmanned aerial vehicles (UAVs) flying over an area of interest. In an aspect, the computing device 102 may receive the LiDAR point cloud data collected by the UAVs flying over the area of interest.

At step 504, the method 500 includes forming a 3D static surface model of the area of interest from the LiDAR point cloud data. In an aspect, the computing device 102 may form the 3D static surface model of the area of interest from the LiDAR point cloud data.

At step 506, the method 500 includes obtaining real-time CCTV camera images of the area of interest. In an aspect, the computing device 102 may obtain the real-time CCTV camera images of the area of interest.

At step 508, the method 500 includes adding the real-time CCTV camera images to the 3D static surface model to generate a real-time dynamic 3D mode. In an aspect, the computing device 102 may add the real-time CCTV camera images to the 3D static surface model to generate the real-time dynamic 3D mode.

At step 510, the method 500 includes identifying a plurality of dynamic objects in the real-time dynamic 3D model. In an aspect, the computing device 102 may identify the plurality of dynamic objects in the real-time dynamic 3D model.

At step 512, the method 500 includes generating a density map of the area of interest. In an aspect, the computing device 102 may generate the density map of the area of interest.

At step 514, the method 500 includes adding the density map to the real-time dynamic 3D model. In an aspect, the computing device 102 may add the density map to the real-time dynamic 3D model.

At step 516, the method 500 includes identifying which dynamic objects are people. In an aspect, the computing device 102 may identify which dynamic objects are people.

At step 518, the method 500 includes replacing each person with an animated character. In an aspect, the computing device 102 may replace each person with the animated character.

At step 520, the method 500 includes displaying the real-time dynamic 3D model. In an aspect, the computing device 102 may display the real-time dynamic 3D model.

At step 522, the method 500 includes monitoring the real-time dynamic 3D model in the area of interest for dangerous situations. In an aspect, the computing device 102 may monitor the real-time dynamic 3D model in the area of interest for dangerous situations.

At step 524, the method 500 includes simulating an evacuation of the area of interest by manipulating the animated characters onto pathways leading away from the area of interest. In an aspect, the computing device 102 may simulate the evacuation of the area of interest by manipulating the animated characters onto pathways leading away from the area of interest.

At step 526, the method 500 includes forming an evacuation strategy for the crowd. In an aspect, the computing device 102 may form the evacuation strategy for the crowd.

At step 528, the method 500 includes displaying the real-time dynamic 3D model. In an aspect, the computing device 102 may display the real-time dynamic 3D model.

At step 530, the method 500 includes monitoring the real-time dynamic 3D model in the area of interest for dangerous situations. In an aspect, the computing device 102 may monitor the real-time dynamic 3D model in the area of interest for dangerous situations.

At step 532, the method 500 includes transmitting a notice of the dangerous situation and the evacuation strategy to an emergency authority. In an aspect, the computing device 102 may transmit the notice of the dangerous situation and the evacuation strategy to the emergency authority.

The first embodiment is illustrated with respect to FIGS. 1-5D. The first embodiment describes a method for real-time crowd management. The method includes receiving LiDAR point cloud data collected by unmanned aerial vehicles (UAVs) flying over an area of interest, forming a 3D static surface model of the area of interest from the LiDAR point cloud data, obtaining real-time CCTV camera images of the area of interest, adding the real-time CCTV camera images to the 3D static surface model to generate a real-time dynamic 3D model, identifying a plurality of dynamic objects in the real-time dynamic 3D model, generating a density map of the area of interest, adding the density map to the real-time dynamic 3D model, identifying which dynamic objects are people, replacing each person with an animated character, displaying the real-time dynamic 3D model, monitoring the real-time dynamic 3D model in the area of interest for dangerous situations, simulating an evacuation of the area of interest by manipulating the animated characters onto pathways leading away from the area of interest, forming an evacuation strategy for the crowd, and transmitting a notice of the dangerous situation and the evacuation strategy to an emergency authority.

The method includes transmitting the LiDAR point cloud data and real-time CCTV camera images to an edge cloud server, generating the density map and the real-time dynamic 3D model by artificial intelligence algorithms stored in the edge cloud server, generating a data packet including the LiDAR point cloud data, real-time CCTV camera images, density map and the real-time dynamic 3D model, transmitting the data packet to a remote cloud server, and forming the evacuation strategy by a trained artificial intelligence deep learning module stored in the remote cloud server.

The method includes assigning an ID to each person, determining a 3D position of each person from a GPS location of each person shown on the density map, and representing the animated character of the person by the ID and the 3D position.

The method includes assigning velocity attributes to each animated character, simulating a dangerous situation in the area of interest, and changing the 3D position and velocity attribute of each animated character to simulate the evacuation of the crowd from the area of interest.

The method includes simulating a fire as the dangerous situation, controlling the progression of the simulated fire, and simulating the evacuation of the crowd along pathways leading away from the fire.

The method includes simulating an overcrowded region as the dangerous situation, forming an evacuation strategy for the overcrowded region, simulating an intervention by emergency personnel, and simulating the evacuation of the crowd by the emergency personnel along pathways leading away the overcrowded region.

The method includes determining, from the density map, at least one of crowd density, crowd speed, and crowd direction.

The method includes identifying regions of the density map which have a density of people greater than a threshold, triggering a danger warning when the density of people is greater than the threshold, dispatching UAVs to each of the regions to collect additional LiDAR point cloud data of the regions, adding the additional LiDAR point cloud data to the real-time dynamic 3D model, monitoring each region for dangerous situations, forming an evacuation strategy for each region when a dangerous situation is detected, and transmitting a notice of the dangerous situation and the evacuation strategy to an emergency authority.

Forming an evacuation strategy includes receiving real-time humidity sensor data from a plurality of humidity sensors in the area of interest, receiving real-time gas sensor data from a plurality of gas sensors in the area of interest, receiving real-time thermal image data from a plurality of infrared cameras in the area of interest, transmitting the LiDAR point cloud data, the real-time CCTV camera images, the real-time humidity sensor data, the real-time gas sensor data, and the real-time thermal image data to an edge cloud server, pre-processing the LiDAR point cloud data, the real-time CCTV camera images, the real-time humidity sensor data, the real-time gas sensor data, and the real-time thermal image data by the edge cloud server to generate a data packet of pre-processed data, transmitting the data packet to a remote cloud server having a trained artificial intelligence deep learning module, generating, by the trained artificial intelligence deep learning module, an analysis of the dangerous situations, and forming the evacuation strategy for the crowd based on the analysis.

The method includes determining, by the trained artificial intelligence deep learning module, crowd density by counting the animated characters in the area of interest, determining, by the trained artificial intelligence deep learning module, crowd speed by averaging the velocities of the animated characters, and determining, by the trained artificial intelligence deep learning module, crowd direction by identifying an average movement of the plurality of animated characters based on changes in the 3D position of each animated character.

The method includes receiving real-time humidity sensor data from a plurality of humidity sensors in the area of interest, receiving real-time gas sensor data from a plurality of gas sensors in the area of interest, receiving real-time thermal images from a plurality of infrared cameras in the area of interest, and updating the real-time dynamic 3D model with the gas sensor data, the humidity sensor data and the thermal images.

The method includes identifying which dynamic objects are moving vehicles, replacing each moving vehicle with an animation of a moving vehicle, and displaying the real-time dynamic 3D model with the animated characters and the animations of the moving vehicles.

The method includes monitoring the real-time dynamic 3D model of the area of interest for potential collisions between the animated characters and the animations of the moving vehicles, detecting a potential collision, simulating an evacuation of the area of interest by manipulating the animated characters onto pathways leading away from the potential collision, generating an evacuation strategy for the crowd, and transmitting a notice of the dangerous situation and the evacuation strategy to an emergency authority.

The second embodiment is illustrated with respect to FIGS. 1-5D. The second embodiment describes a system for real-time crowd management in an area of interest. The system includes a plurality of unmanned aerial vehicles (UAVs) configured to fly within the area of interest, a plurality of LiDAR sensors, each LiDAR sensor located in one of the plurality of UAVs, wherein each LiDAR sensor is configured to generate point cloud data, a plurality of humidity sensors located in the area of interest, each humidity sensor configured to detect water content of air in the area of interest and generate humidity sensor data, a plurality of gas sensors located in the area of interest, each gas sensor configured to detect a specific gas in the air of the area of interest and generate gas detection data, a plurality of infrared cameras located in the area of interest, wherein each infrared camera is configured to take thermally image the area of interest, and generate thermal image data, a computing device having circuitry including a memory storing program instructions and one or more processors configured to perform the program instructions, wherein the computing device is configured to receive the point cloud data, the CCTV image data, the humidity sensor data, the gas detection data, and the thermal image data and generate a real-time dynamic 3D model of the area of interest.

The computing device is further configured to identify a plurality of dynamic objects in the real-time dynamic 3D model, generate a density map of the area of interest, add the density map to the real-time dynamic 3D model, identify which dynamic objects are people, replace each person with an animated character, and display the real-time dynamic 3D model.

The computing device is further configured to monitor the real-time dynamic 3D model of the area of interest for dangerous situations, simulate an evacuation of the area of interest by manipulating the animated characters onto pathways leading away from the area of interest, generate an evacuation strategy for the crowd, and transmit a notice of the dangerous situation and the evacuation strategy to an emergency authority.

The computing device is further configured to identify regions of the density map which have a density of people greater than a threshold, trigger a danger warning when the density of people is greater than the threshold, dispatch UAVs to each of the regions to collect additional LiDAR point cloud data of the regions, add the additional LiDAR point cloud data to the real-time dynamic 3D model, monitor each region for dangerous situations, generate an evacuation strategy for each region when a dangerous situation is detected, and transmit a notice of the dangerous situation and the evacuation strategy to an emergency authority.

The system includes an edge cloud server wirelessly connected to the plurality of LiDAR sensors, the plurality of CCTV surveillance cameras, the plurality of humidity sensors, the plurality of gas sensors, the plurality of infrared cameras and the computing device, the edge cloud server configured to receive the point cloud data, the CCTV image data, the humidity sensor data, the gas detection data, the thermal image data, and real-time dynamic 3D model, pre-process the point cloud data, the CCTV image data, the humidity sensor data, the gas detection data, and the thermal image data, generate a packet of pre-processed data, and transmit the pre-processed data to a remote cloud server.

The system includes a trained artificial intelligence deep learning module located in the remote cloud server, wherein the trained artificial intelligence deep learning module is configured to generate an analysis of the dangerous situations, generate the evacuation strategy for the crowd based on the analysis, and transmit the evacuation strategy to the computing device.

The third embodiment is illustrated with respect to FIGS. 1-5D. The third embodiment describes a non-transitory computer readable medium having instructions stored therein that, when executed by one or more processors, cause the one or more processors to perform a method for real-time crowd management. The method includes identifying an area of interest, receiving LiDAR point cloud data collected by unmanned aerial vehicles (UAVs) flying over the area of interest, forming a 3D static surface model of the area of interest from the LiDAR point cloud data, receiving real-time CCTV camera images from a plurality of surveillance cameras in the area of interest, adding the CCTV camera images to the 3D static surface model to generate a real-time dynamic 3D model, identifying a plurality of dynamic objects in the real-time dynamic 3D model, generating a density map of the area of interest, adding the density map to the real-time dynamic 3D model, identifying which dynamic objects are people, replacing each person with an animated character, displaying the real-time dynamic 3D model, monitoring the real-time dynamic 3D model in the area of interest for dangerous situations, simulating an evacuation of the area of interest by manipulating the animated characters onto pathways leading away from the area of interest, generating an evacuation strategy for the crowd, and transmitting a notice of the dangerous situation and the evacuation strategy to an emergency authority.

Next, further details of the hardware description of the computing environment of FIG. 1 according to exemplary embodiments is described with reference to FIG. 6.

Figure 6:
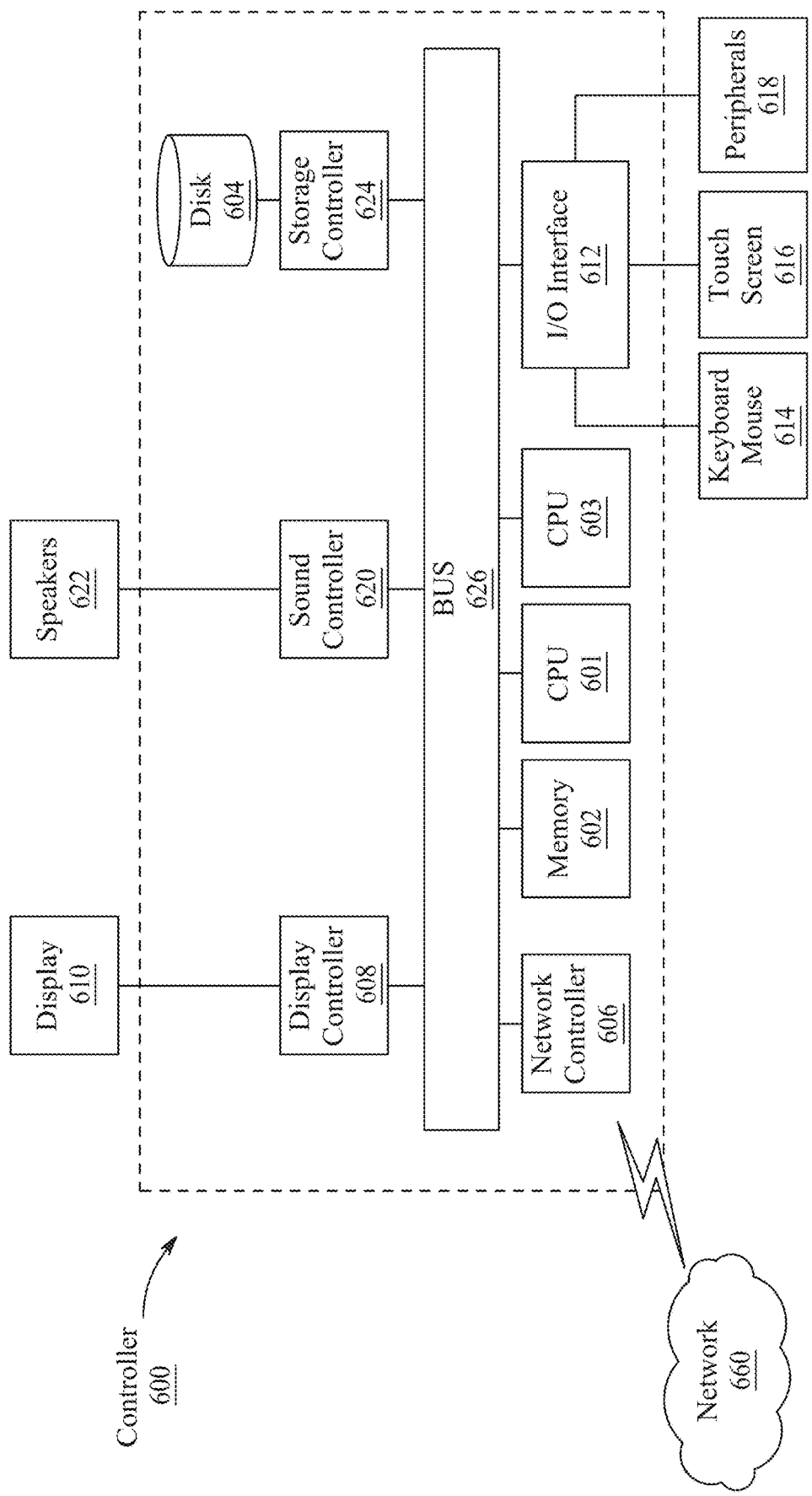
FIG. 6 is an illustration of a non-limiting example of details of computing hardware used in the computing device, according to aspects of the present disclosure.

In FIG. 6, a controller 600 is described is representative of the system 100 of FIG. 1 in which the controller is a computing device which includes a CPU 601 which performs the processes described above/below.

FIG. 6 is an illustration of a non-limiting example of details of computing hardware used in the computing system, according to exemplary aspects of the present disclosure. In FIG. 6, a controller 600 is described which is a computing device (that includes, the computing device 102) and includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general-purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
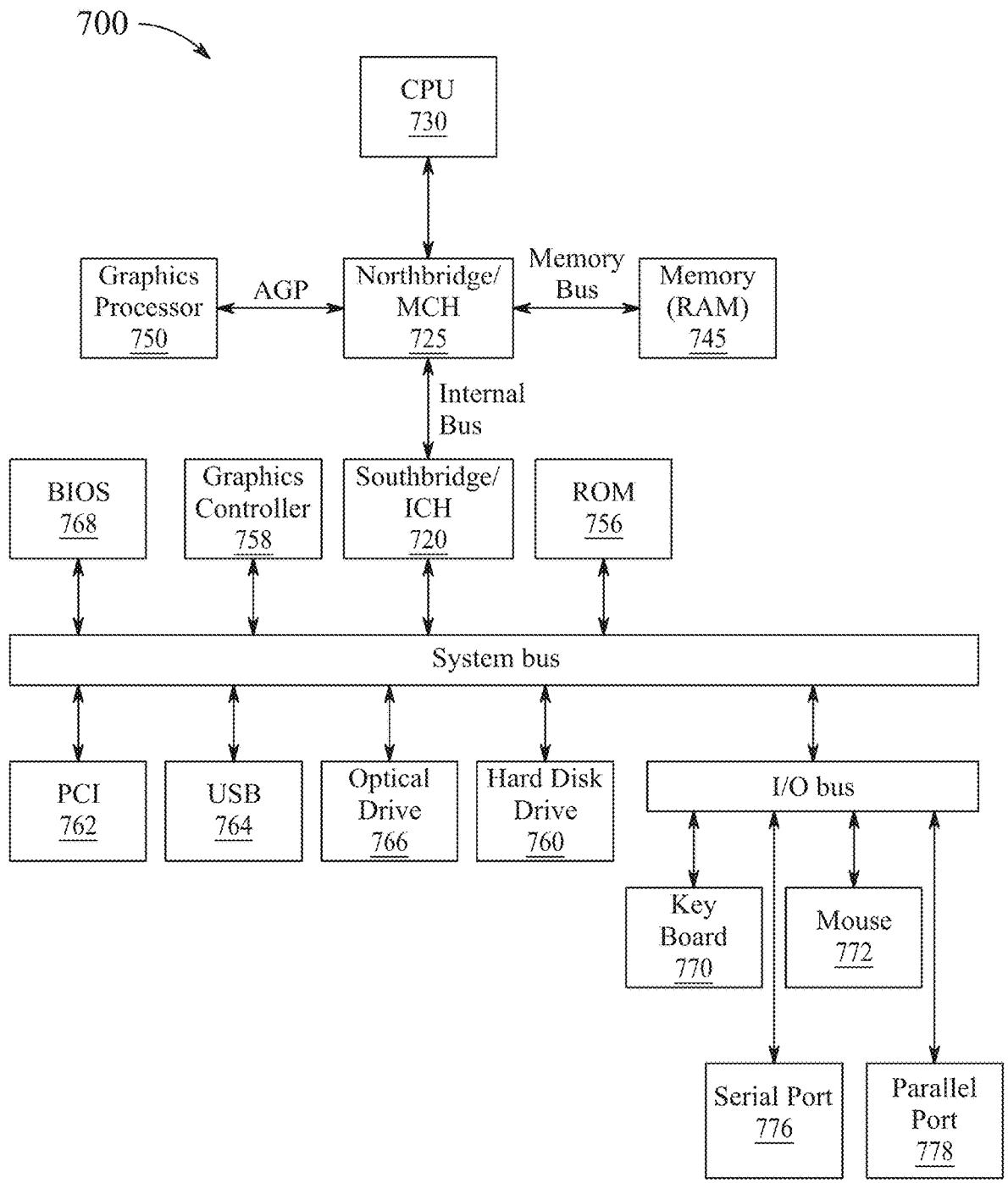
FIG. 7 is an exemplary schematic diagram of a data processing system used within the computing device, according to aspects of the present disclosure.

FIG. 7 shows a schematic diagram of a data processing system 700 used within the computing system, according to exemplary aspects of the present disclosure. The data processing system 700 is an example of a computer in which code or instructions implementing the processes of the illustrative aspects of the present disclosure may be located.

In FIG. 7, data processing system 780 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
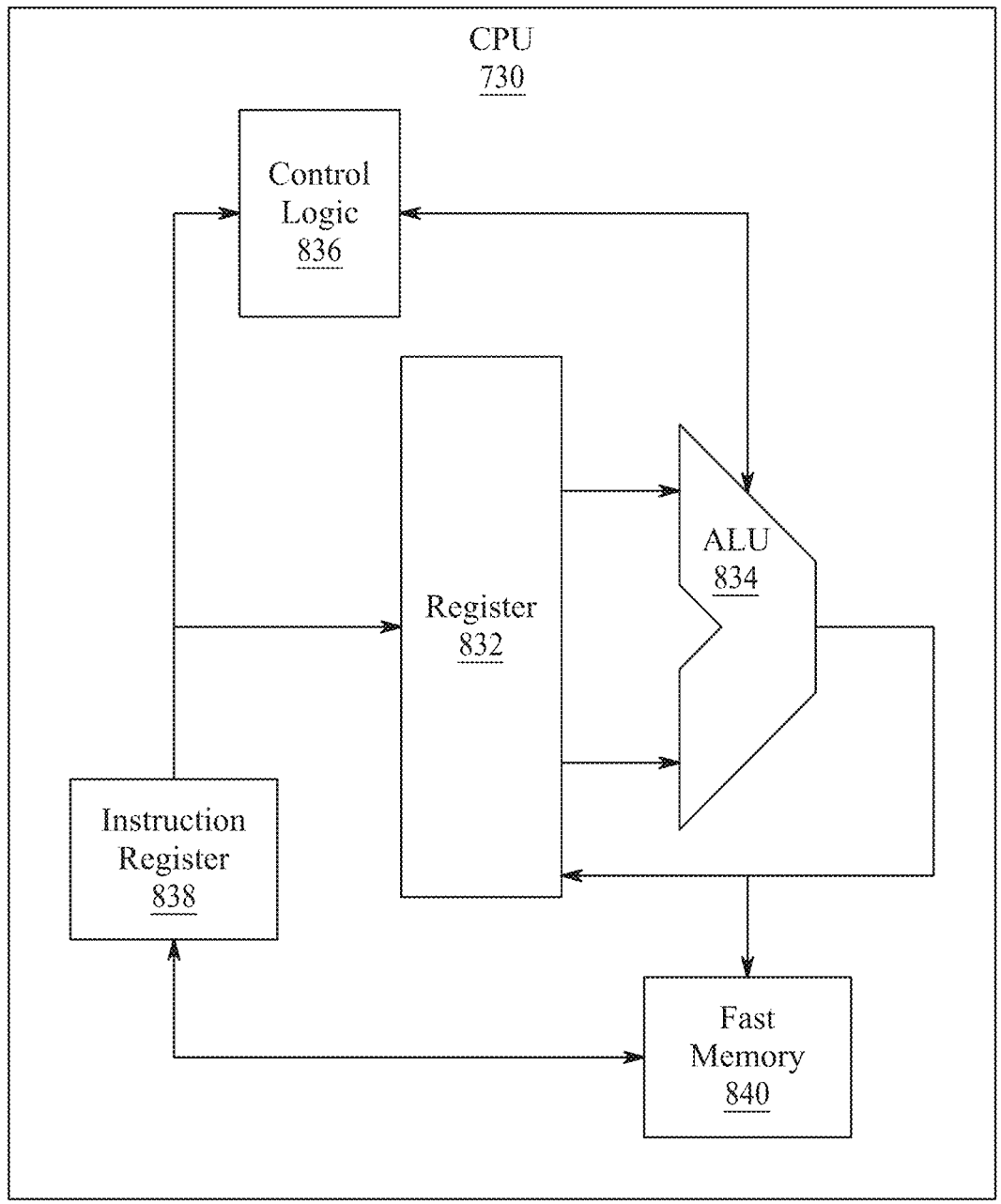
FIG. 8 is an exemplary schematic diagram of a processor used with the computing device, according to aspects of the present disclosure.

For example, FIG. 8 shows one aspects of the present disclosure of CPU 730. In one aspects of the present disclosure, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 832. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain aspects of the present disclosures, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices may include, for example, Ethernet adapters, add-in cards, and PC cards for notebook computers. The Hard disk drive 760 and CD-ROM 756 can use, for example, an integrated drive electronics (IDE) or serial advanced technology attachment (SATA) interface. In one aspects of the present disclosure the I/O bus can include a super I/O (SIO) device.

Further, the hard disk drive (HDD) 760 and optical drive 766 can also be coupled to the SB/ICH 720 through a system bus. In one aspects of the present disclosure, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
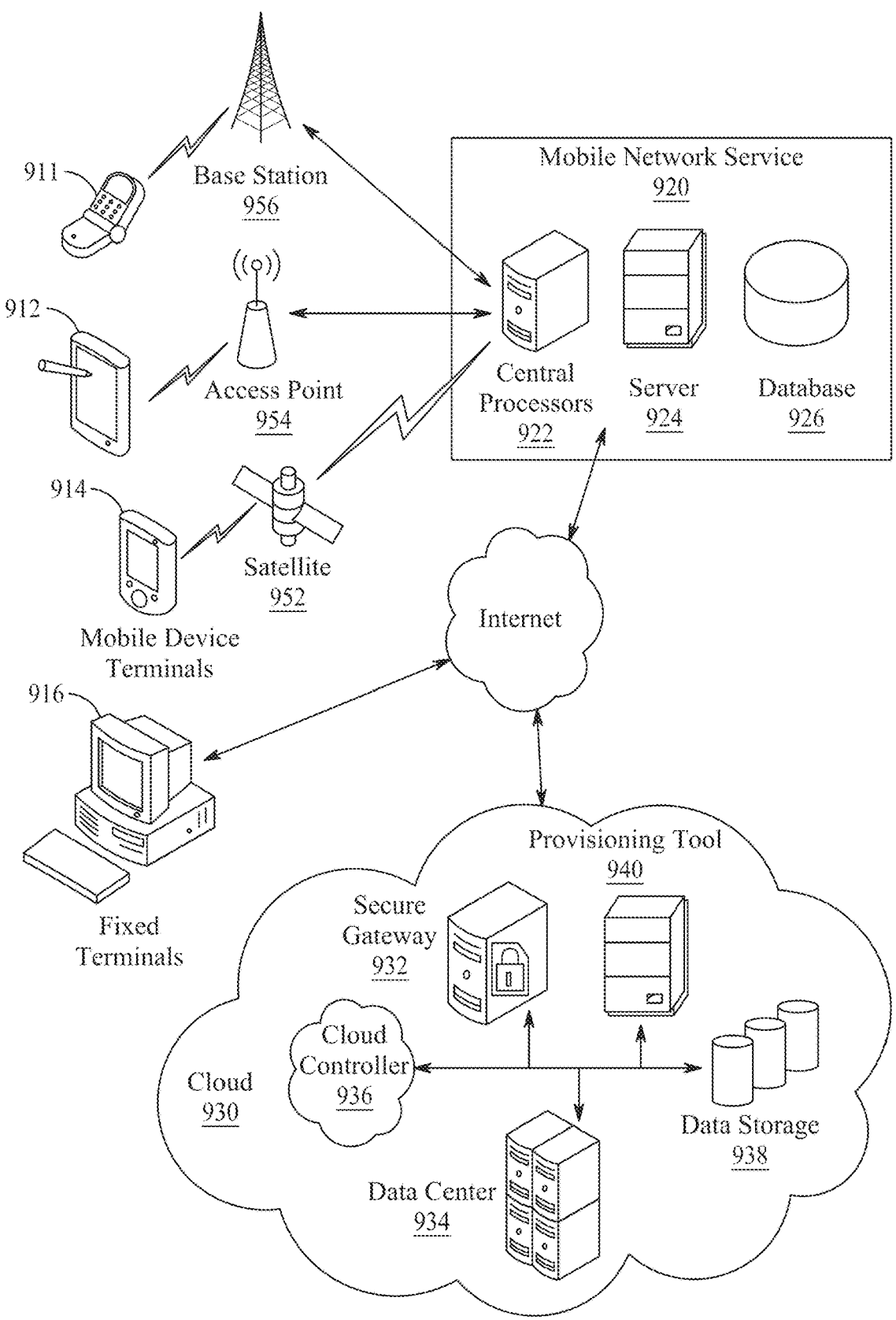
FIG. 9 is an illustration of a non-limiting example of distributed components which may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for real-time crowd management, comprising:
   receiving LiDAR point cloud data collected by unmanned aerial vehicles (UAVs) flying over an area of interest;
   forming a 3D static surface model of the area of interest from the LiDAR point cloud data;
   obtaining real-time CCTV camera images of the area of interest;
   adding the real-time CCTV camera images to the 3D static surface model to generate a real-time dynamic 3D model;
   identifying a plurality of dynamic objects in the real-time dynamic 3D model;
   generating a density map of the area of interest;
   adding the density map to the real-time dynamic 3D model;
   identifying which dynamic objects are people;
   replacing each person with an animated character;
   displaying the real-time dynamic 3D model;
   monitoring the real-time dynamic 3D model in the area of interest for dangerous situations;
   simulating an evacuation of the area of interest by manipulating the animated characters onto pathways leading away from the area of interest;
   forming an evacuation strategy for the crowd;
   transmitting a notice of the dangerous situation and the evacuation strategy to an emergency authority;
   assigning an ID to each person;
   determining a 3D position of each person from a GPS location of each person shown on the density map; and
   representing the animated character of the person by the ID and the 3D position.

2. The method of claim 1, further comprising:
   transmitting the LiDAR point cloud data and real-time CCTV camera images to an edge cloud server;
   generating the density map and the real-time dynamic 3D model by artificial intelligence algorithms stored in the edge cloud server;
   generating a data packet including the LiDAR point cloud data, real-time CCTV camera images, density map and the real-time dynamic 3D model;
   transmitting the data packet to a remote cloud server; and
   forming the evacuation strategy by a trained artificial intelligence deep learning module stored in the remote cloud server.

3. The method of claim 1, further comprising:
   assigning velocity attributes to each animated character;
   simulating a dangerous situation in the area of interest; and
   changing the 3D position and velocity attribute of each animated character to simulate the evacuation of the crowd from the area of interest.

4. The method of claim 3, further comprising:
   simulating a fire as the dangerous situation;
   controlling the progression of the simulated fire; and
   simulating the evacuation of the crowd along pathways leading away from the fire.

5. The method of claim 3, further comprising:
   simulating an overcrowded region as the dangerous situation;
   forming an evacuation strategy for the overcrowded region;
   simulating an intervention by emergency personnel; and
   simulating the evacuation of the crowd by the emergency personnel along pathways leading away the overcrowded region.

6. The method of claim 3, further comprising:
   determining, from the density map, at least one of:
   crowd density,
   crowd speed, and
   crowd direction.

7. The method of claim 3, further comprising:
   identifying regions of the density map which have a density of people greater than a threshold;
   triggering a danger warning when the density of people is greater than the threshold;
   dispatching UAVs to each of the regions to collect additional LiDAR point cloud data of the regions;
   adding the additional LiDAR point cloud data to the real-time dynamic 3D model;
   monitoring each region for dangerous situations;
   forming an evacuation strategy for each region when a dangerous situation is detected; and
   transmitting a notice of the dangerous situation and the evacuation strategy to an emergency authority.

8. The method of claim 7, wherein forming an evacuation strategy comprises:
   receiving real-time humidity sensor data from a plurality of humidity sensors in the area of interest;
   receiving real-time gas sensor data from a plurality of gas sensors in the area of interest;

receiving real-time thermal image data from a plurality of infrared cameras in the area of interest;

transmitting the LiDAR point cloud data, the real-time CCTV camera images, the real-time humidity sensor data, the real-time gas sensor data, and the real-time thermal image data to an edge cloud server;

pre-processing the LiDAR point cloud data, the real-time CCTV camera images, the real-time humidity sensor data, the real-time gas sensor data, and the real-time thermal image data by the edge cloud server to generate a data packet of pre-processed data;

transmitting the data packet to a remote cloud server having a trained artificial intelligence deep learning module;

generating, by the trained artificial intelligence deep learning module, an analysis of the dangerous situations; and forming the evacuation strategy for the crowd based on the analysis.

9. The method of claim 8, further comprising:

determining, by the trained artificial intelligence deep learning module, crowd density by counting the animated characters in the area of interest;

determining, by the trained artificial intelligence deep learning module, crowd speed by averaging the velocities of the animated characters; and determining, by the trained artificial intelligence deep learning module, crowd direction by identifying an average movement of the plurality of animated characters based on changes in the 3D position of each animated character.

10. The method of claim 1, further comprising:

receiving real-time humidity sensor data from a plurality of humidity sensors in the area of interest;

receiving real-time gas sensor data from a plurality of gas sensors in the area of interest;

receiving real-time thermal images from a plurality of infrared cameras in the area of interest; and updating the real-time dynamic 3D model with the gas sensor data, the humidity sensor data and the thermal images.

11. The method of claim 1, further comprising:

identifying which dynamic objects are moving vehicles;

replacing each moving vehicle with an animation of a moving vehicle; and displaying the real-time dynamic 3D model with the animated characters and the animations of the moving vehicles.

12. The method of claim 11, further comprising:

monitoring the real-time dynamic 3D model of the area of interest for potential collisions between the animated characters and the animations of the moving vehicles;

detecting a potential collision;

simulating an evacuation of the area of interest by manipulating the animated characters onto pathways leading away from the potential collision;

generating an evacuation strategy for the crowd; and transmitting a notice of the dangerous situation and the evacuation strategy to an emergency authority.

13. A system for real-time crowd management in an area of interest, comprising:

a plurality of unmanned aerial vehicles (UAVs) configured to fly within the area of interest;

a plurality of LiDAR sensors, each LiDAR sensor located in one of the plurality of UAVs, wherein each LiDAR sensor is configured to generate point cloud data;

a plurality of CCTV surveillance cameras located in the area of interest, wherein each CCTV surveillance camera is configured to take images of the area of interest, and generate CCTV image data;

a plurality of humidity sensors located in the area of interest, each humidity sensor configured to detect water content of air in the area of interest and generate humidity sensor data;

a plurality of gas sensors located in the area of interest, each gas sensor configured to detect a specific gas in the air of the area of interest and generate gas detection data;

a plurality of infrared cameras located in the area of interest, wherein each infrared camera is configured thermally image the area of interest, and generate thermal image data; and a computing device having circuitry including a memory storing program instructions and one or more processors configured to perform the program instructions, wherein the computing device is configured to:

receive the point cloud data, the CCTV image data, the humidity sensor data, the gas detection data, and the thermal image data and generate a real-time dynamic 3D model of the area of interest;

identify a plurality of dynamic objects in the real-time dynamic 3D model;

generate a density map of the area of interest;

add the density map to the real-time dynamic 3D model, identify which dynamic objects are people;

replace each person with an animated character;

display the real-time dynamic 3D model;

monitor the real-time dynamic 3D model of the area of interest for dangerous situations;

simulate an evacuation of the area of interest by manipulating the animated characters onto pathways leading away from the area of interest;

generate an evacuation strategy for the crowd;

transmit a notice of the dangerous situation and the evacuation strategy to an emergency authority;

identify regions of the density map which have a density of people greater than a threshold;

trigger a danger warning when the density of people is greater than the threshold;

dispatch UAVs to each of the regions to collect additional LiDAR point cloud data of the regions;

add the additional LiDAR point cloud data to the real-time dynamic 3D model;

monitor each region for dangerous situations;

generate an evacuation strategy for each region when a dangerous situation is detected; and transmit a notice of the dangerous situation and the evacuation strategy to an emergency authority.

14. The system of claim 13, further comprising:

an edge cloud server wirelessly connected to the plurality of LiDAR sensors, the plurality of CCTV surveillance cameras, the plurality of humidity sensors, the plurality of gas sensors, the plurality of infrared cameras and the computing device, the edge cloud server configured to:

receive the point cloud data, the CCTV image data, the humidity sensor data, the gas detection data, the thermal image data, and real-time dynamic 3D model, pre-process the point cloud data, the CCTV image data, the humidity sensor data, the gas detection data, and the thermal image data, generate a packet of pre-processed data, and
transmit the pre-processed data to a remote cloud server.

15. The system of claim 14, further comprising:
a trained artificial intelligence deep learning module located in the remote cloud server, wherein the trained artificial intelligence deep learning module is configured to:
generate an analysis of the dangerous situations;
generate the evacuation strategy for the crowd based on the analysis; and
transmit the evacuation strategy to the computing device.

\* \* \* \* \*